(12) United States Patent
Tanaka et al.

(10) Patent No.: US 8,145,069 B2
(45) Date of Patent: Mar. 27, 2012

(54) OPTICAL TRANSMITTER

(75) Inventors: Toshiki Tanaka, Kawasaki (JP); Takeshi Hoshida, Kawasaki (JP); Hisao Nakashima, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 11/740,954

(22) Filed: Apr. 27, 2007

(65) Prior Publication Data
US 2008/0080872 A1 Apr. 3, 2008

(30) Foreign Application Priority Data
Sep. 29, 2006 (JP) .................................. 2006-269362

(51) Int. Cl.
*H04B 10/04* (2006.01)

(52) U.S. Cl. ........ 398/198; 398/182; 398/183; 398/188; 398/192; 398/195; 398/197; 398/201

(58) Field of Classification Search .......... 398/182–201; 359/237–239
See application file for complete search history.

(56) References Cited

U.S. PATENT DOCUMENTS

| | | | |
|---|---|---|---|
| 5,170,274 A | 12/1992 | Kuwata et al. | |
| 5,359,449 A * | 10/1994 | Nishimoto et al. | 398/198 |
| 6,278,539 B1 * | 8/2001 | Ooi et al. | 359/237 |
| 6,407,845 B2 * | 6/2002 | Nakamoto | 359/239 |
| 6,583,910 B1 | 6/2003 | Satoh | |
| 6,970,655 B2 | 11/2005 | Ono et al. | |
| 7,266,306 B1 * | 9/2007 | Harley et al. | 398/182 |
| 2001/0007508 A1 | 7/2001 | Ooi et al. | |
| 2002/0005975 A1 | 1/2002 | Nakamoto | |
| 2003/0185575 A1 * | 10/2003 | Ikeuchi | 398/197 |
| 2003/0210914 A1 * | 11/2003 | Khayim et al. | 398/197 |
| 2004/0028418 A1 * | 2/2004 | Kaplan et al. | 398/188 |
| 2004/0081470 A1 | 4/2004 | Griffin | |
| 2004/0161249 A1 * | 8/2004 | Suda et al. | 398/198 |
| 2005/0002676 A1 * | 1/2005 | Zitelli | 398/188 |
| 2005/0068600 A1 * | 3/2005 | Ogura | 359/238 |
| 2006/0008278 A1 | 1/2006 | Kao et al. | |
| 2006/0088322 A1 * | 4/2006 | Kobayashi et al. | 398/198 |
| 2006/0127102 A1 * | 6/2006 | Roberts et al. | 398/182 |

FOREIGN PATENT DOCUMENTS
CN 1248028 C 3/2006
(Continued)

OTHER PUBLICATIONS

Extended European Search Report, mailed Nov. 12, 2007 and issued in corresponding European Patent Application No. 07008677.2-1246.

(Continued)

*Primary Examiner* — Li Liu
(74) *Attorney, Agent, or Firm* — Staas & Halsey LLP

(57) ABSTRACT

A signal Data1 and Data2 are output from a DQPSK signal source. The output signal is input to the modulator drivers 1 and 2 of the differential output. A drive signal is applied from the drivers 1 and 2 to a modulator, and modulated light is output. An optical coupler 20 branches modulator output, and a power monitor 21 detects the power of the branched light. A detection result is transmitted to an amplitude control unit 22. The amplitude control unit 22 adjusts the amplitude of the drivers 1 and 2 such that the detection result of the power monitor 21 can be the maximum.

9 Claims, 31 Drawing Sheets

FOREIGN PATENT DOCUMENTS

| | | |
|---|---|---|
| EP | 0 792 033 | 8/1997 |
| EP | 1 335 509 | 8/2003 |
| JP | 3-251815 | 11/1991 |
| JP | 5-95153 | 4/1993 |
| JP | 09-236781 | 9/1997 |
| JP | 10-48582 | 2/1998 |
| JP | 11-305175 | 11/1999 |
| JP | 2000-106543 | 4/2000 |
| JP | 2000-162563 | 6/2000 |
| JP | 2002-23124 | 1/2002 |
| JP | 3333133 | 7/2002 |
| JP | 2002-258288 | 9/2002 |
| JP | 2003-021817 | 1/2003 |
| JP | 2003-295138 | 10/2003 |
| JP | 2004-51673 | 6/2004 |
| JP | 2004-309511 | 11/2004 |
| JP | 2005-5767 | 1/2005 |
| JP | 2005-91663 | 4/2005 |
| JP | 2006-20324 | 1/2006 |
| JP | 2007-208472 | 8/2007 |

OTHER PUBLICATIONS

Chinese Office Action issued Mar. 1, 2010 in corresponding Chinese Application No. 200710104840.2.
Chinese Office Action issued Sep. 26, 2010 in corresponding Chinese Application No. 200710104840.2.
Japanese Office Action issued Nov. 2, 2010 in corresponding Japanese Patent Application 2006-269362.
Japanese Office Action issued Apr. 12, 2011 in corresponding Japanese Patent Application 2006-269362.
Japanese Office Action mailed Dec. 27, 2011 issued in corresponding Japanese Patent Application No. 2006-269362.

* cited by examiner

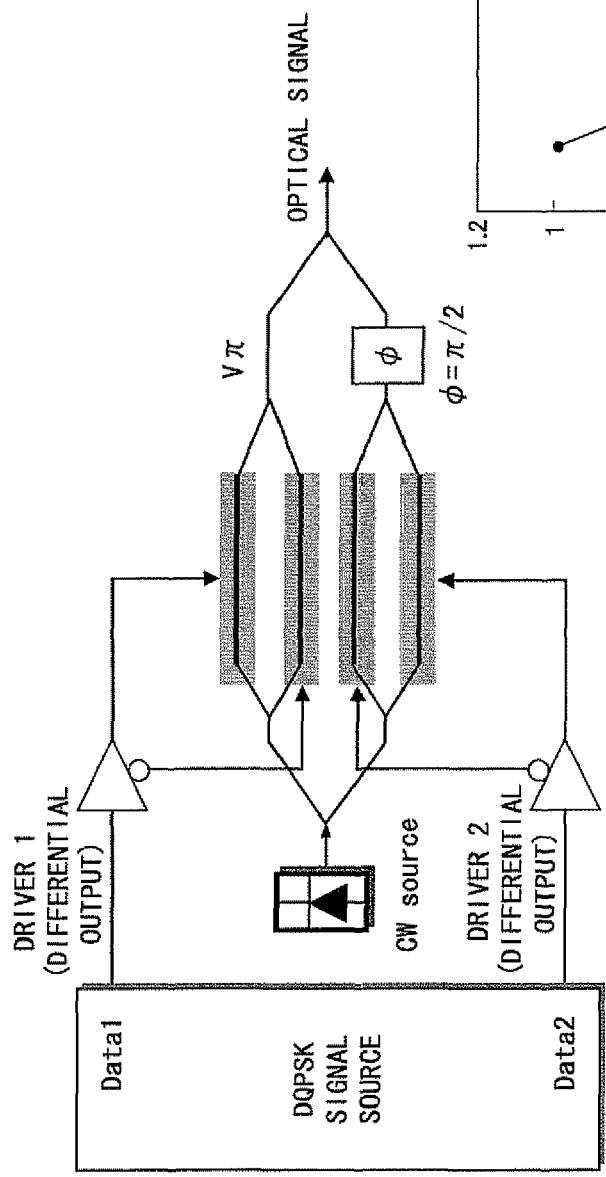
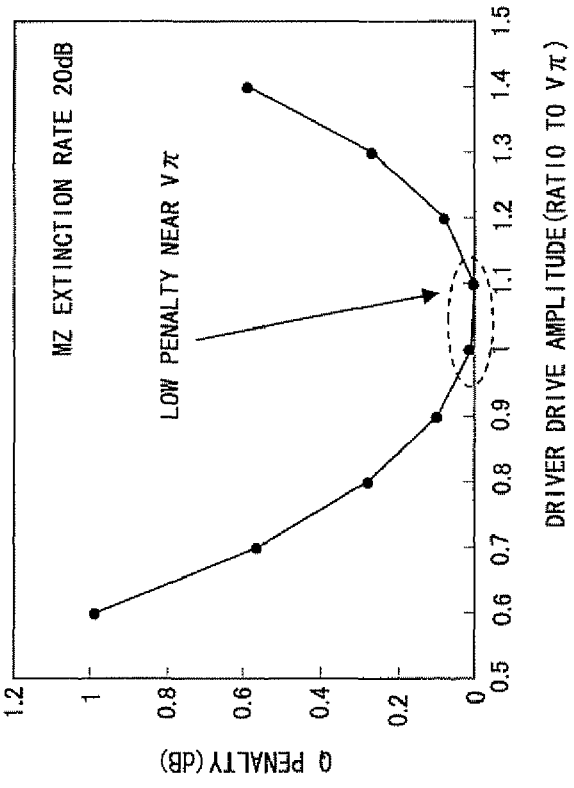
FIG. 4A PRIOR ART
FIG. 4B PRIOR ART

| DRIVE AMPLITUDE | LOWER THAN Vπ | Vπ | HIGHER THAN Vπ |
|---|---|---|---|
| DEVIATION STATE | (constellation diagram, points inside unit circle) | (constellation diagram, points on unit circle) | (constellation diagram, points outside unit circle) |
| DQPSK MODULATION WAVEFORM CALCULATION RESULT (RATIO OF DRIVE AMPLITUDE OF DRIVERS 1 AND 2 TO Vπ) | (DRIVER 1/2: 0.8/0.8) | (DRIVER 1/2: 1.0/1.0) | (DRIVER 1/2: 1.2/1.2) |
| AVERAGE POWER | LOWER THAN AT Vπ | MAXIMUM | LOWER THAN AT Vπ |

FIG. 6A     FIG. 6B     FIG. 6C

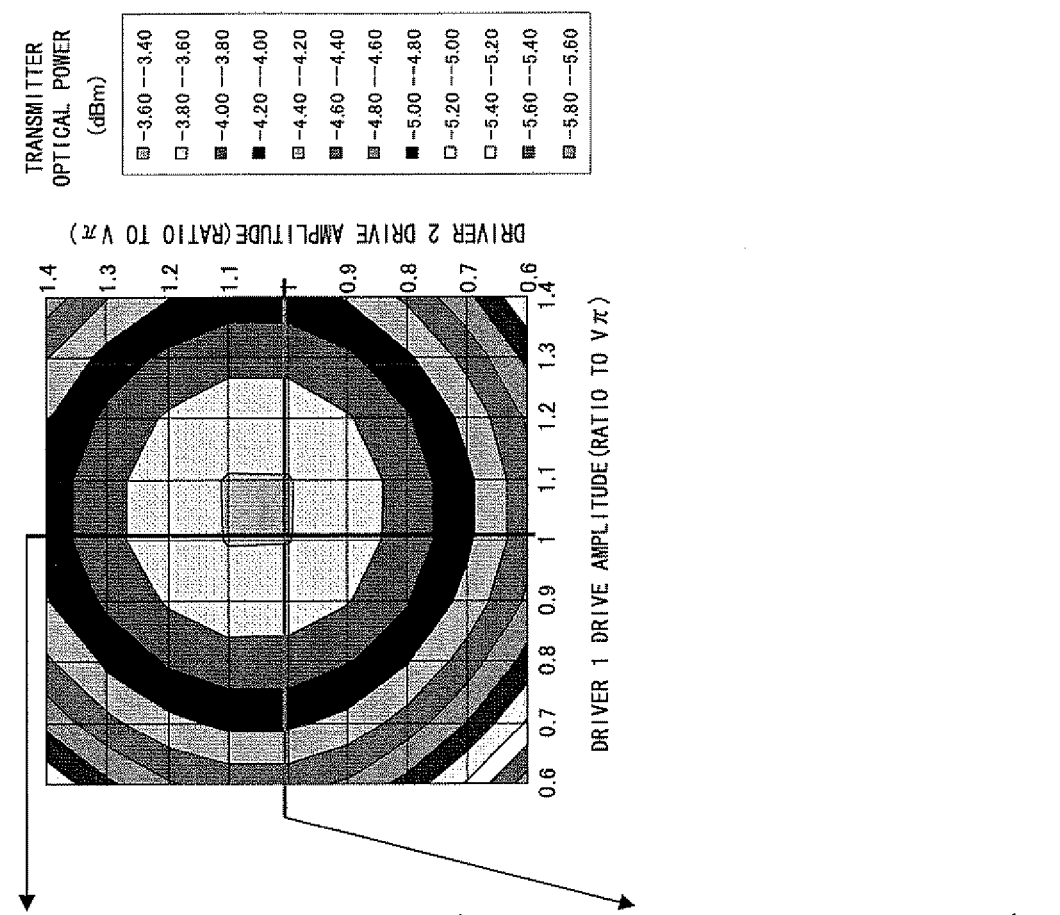
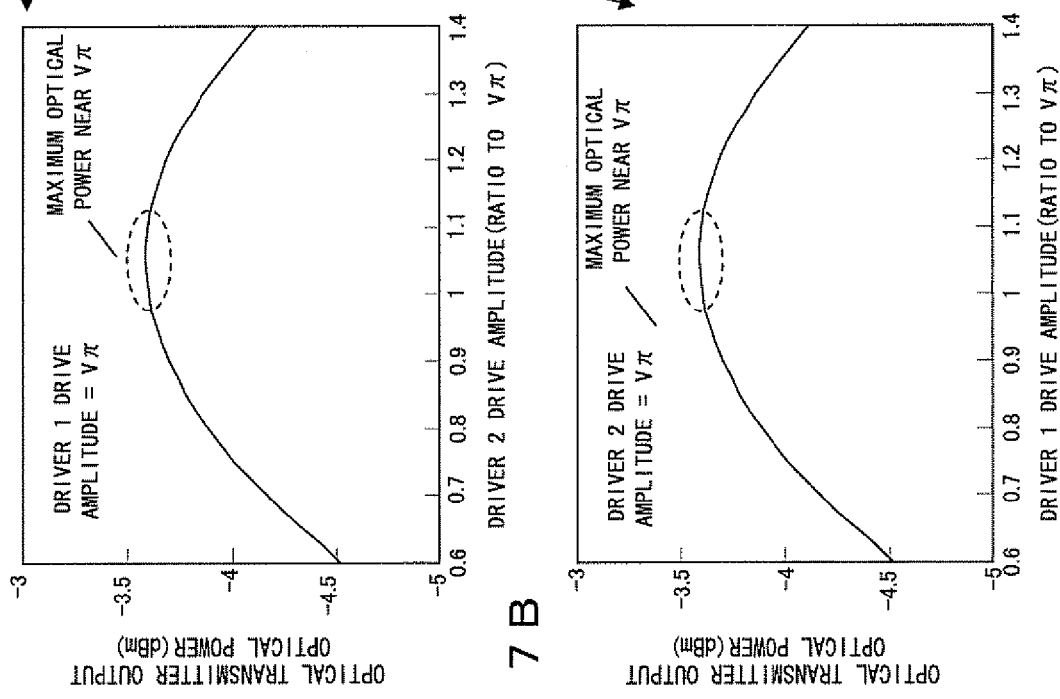

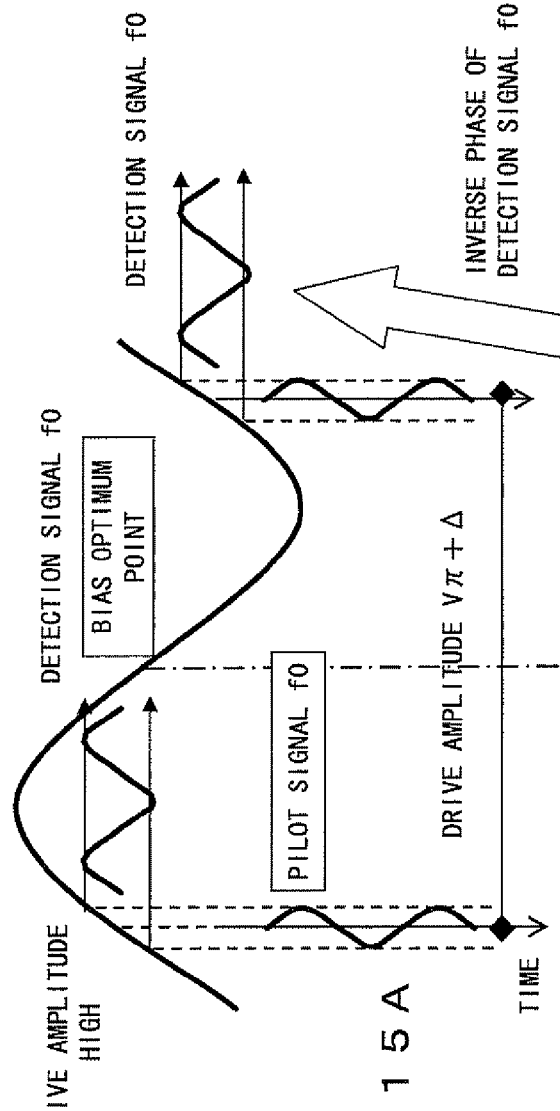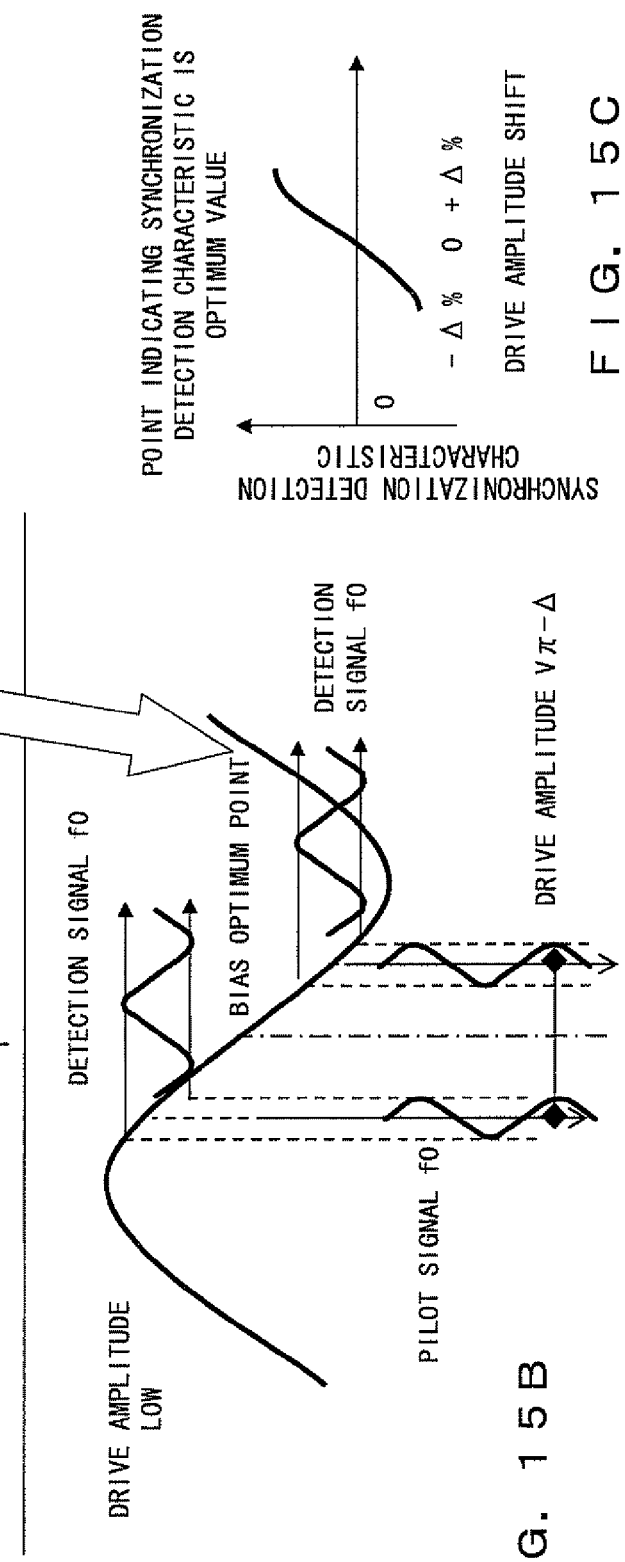
FIG. 15A
FIG. 15B
FIG. 15C

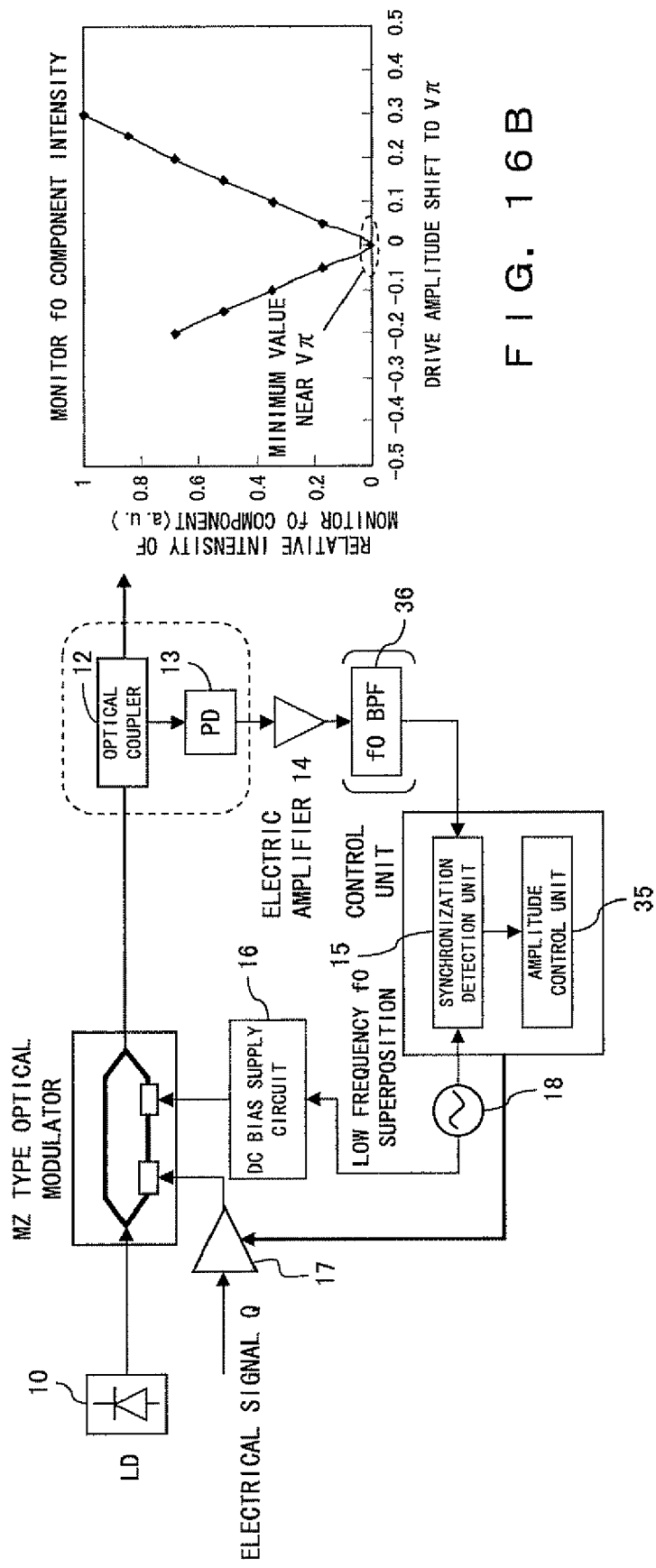

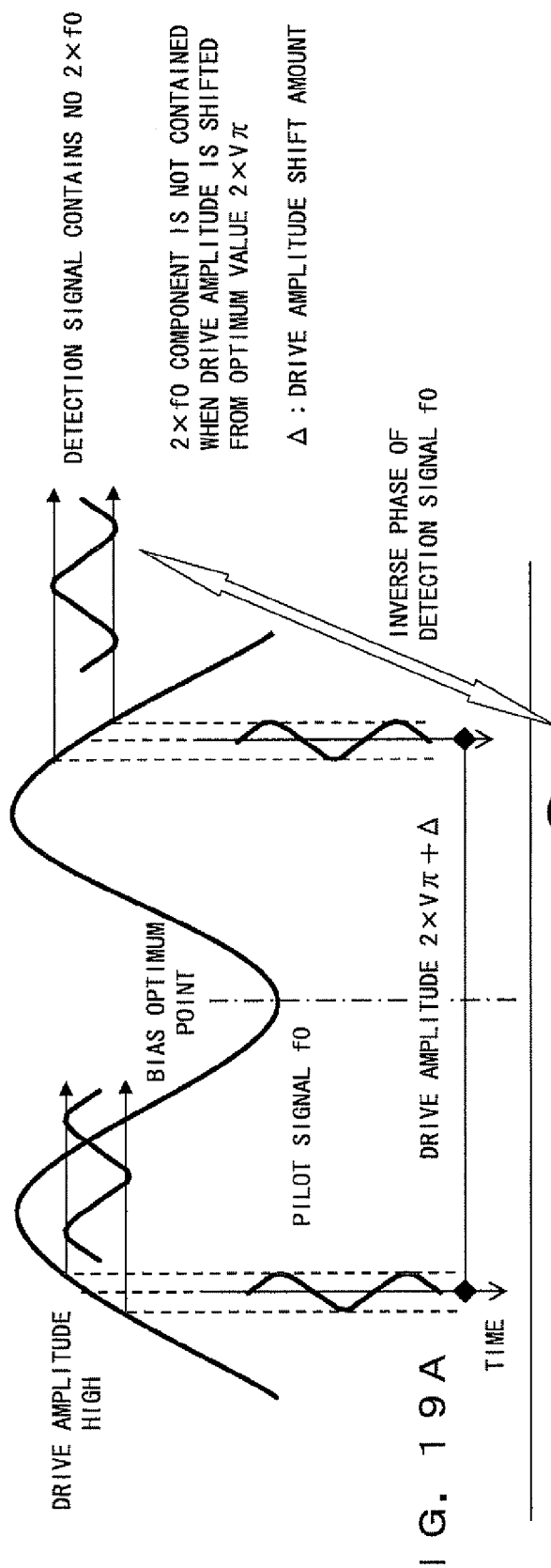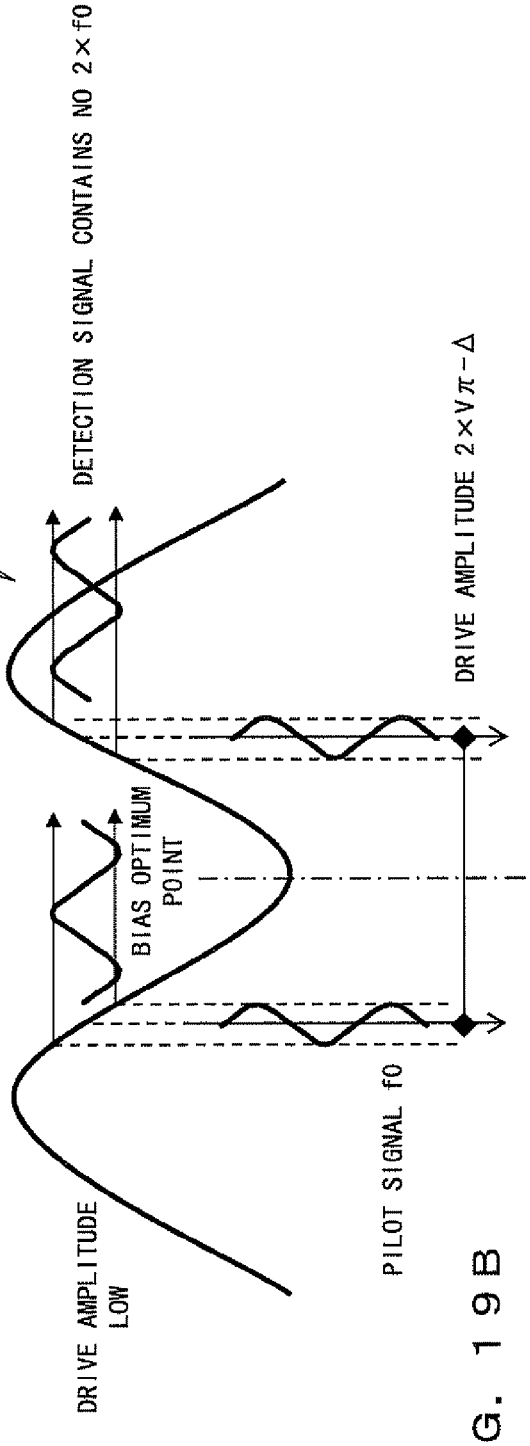
FIG. 19A
FIG. 19B

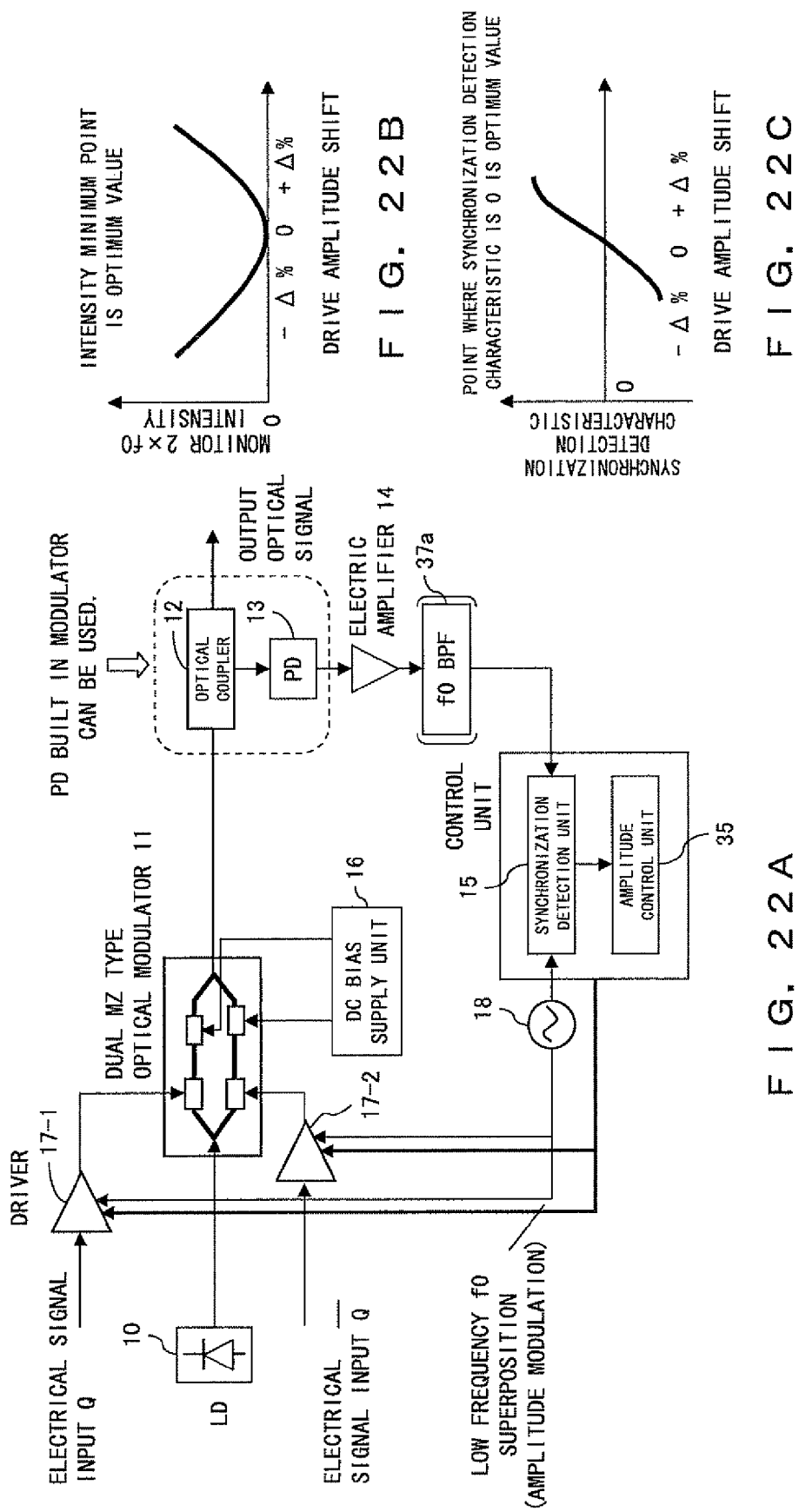

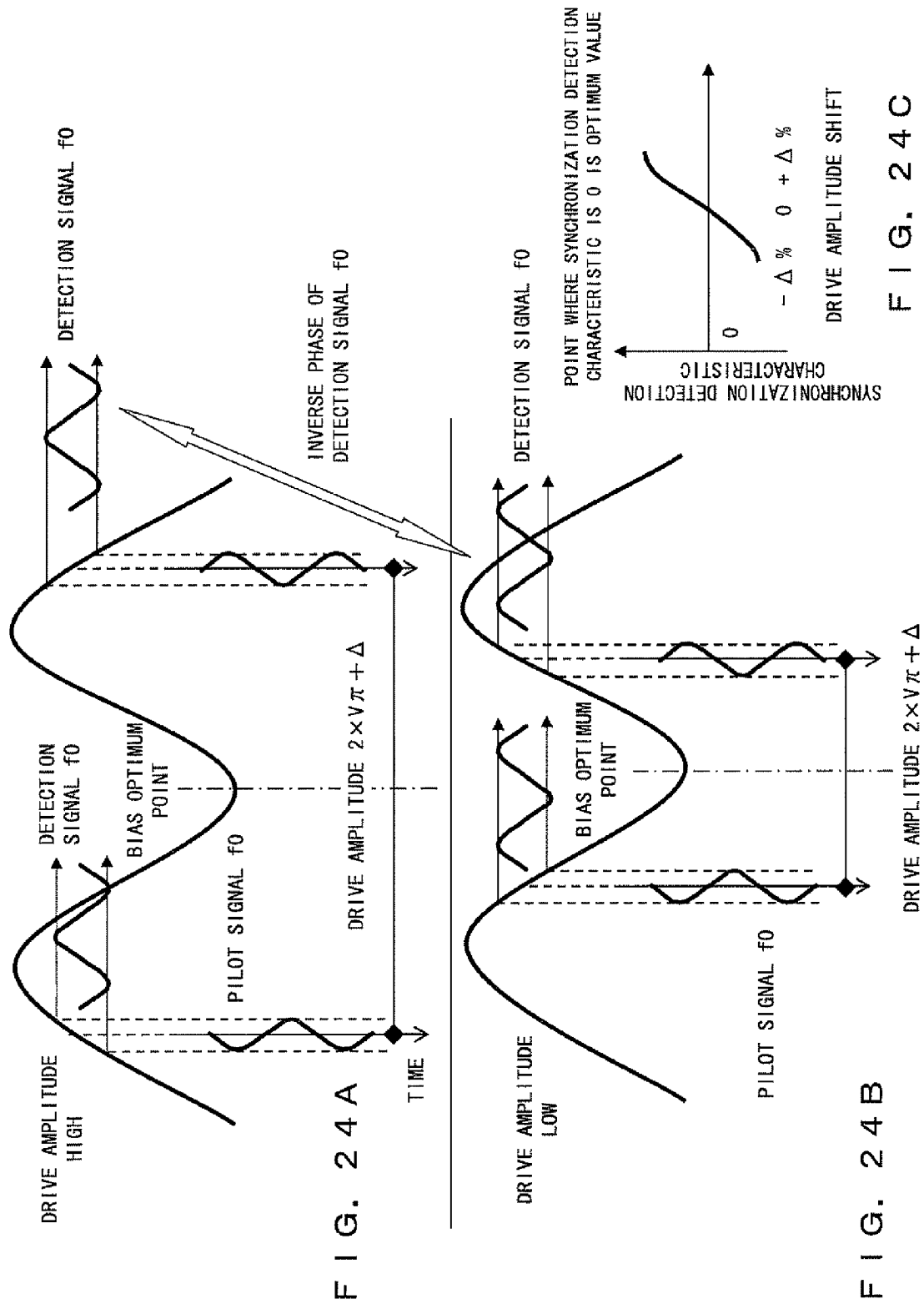

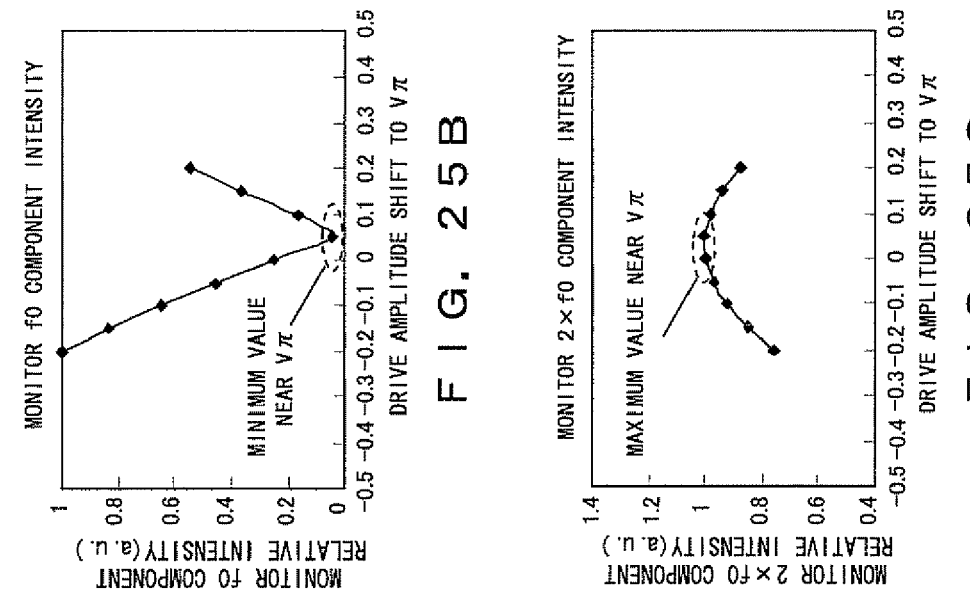
FIG. 25B
FIG. 25C
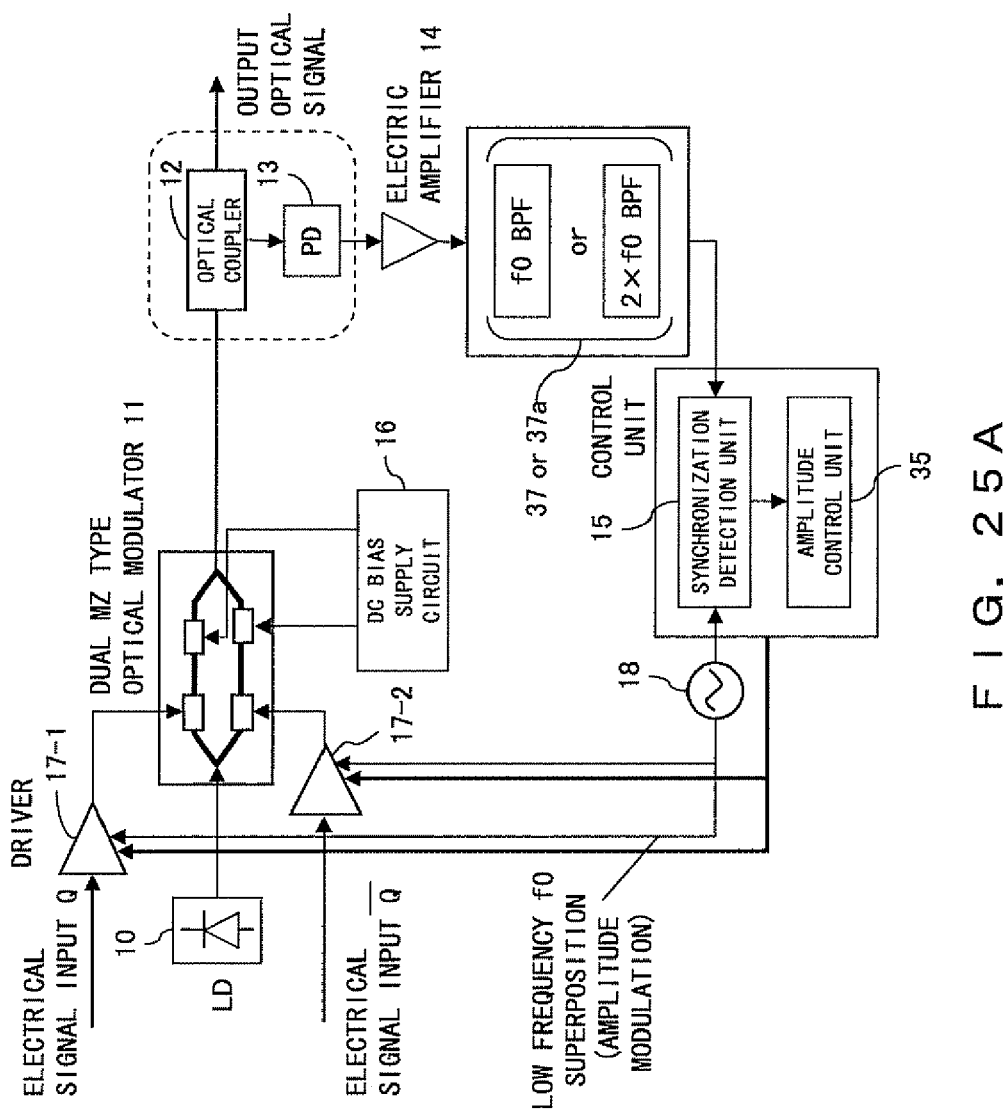
FIG. 25A

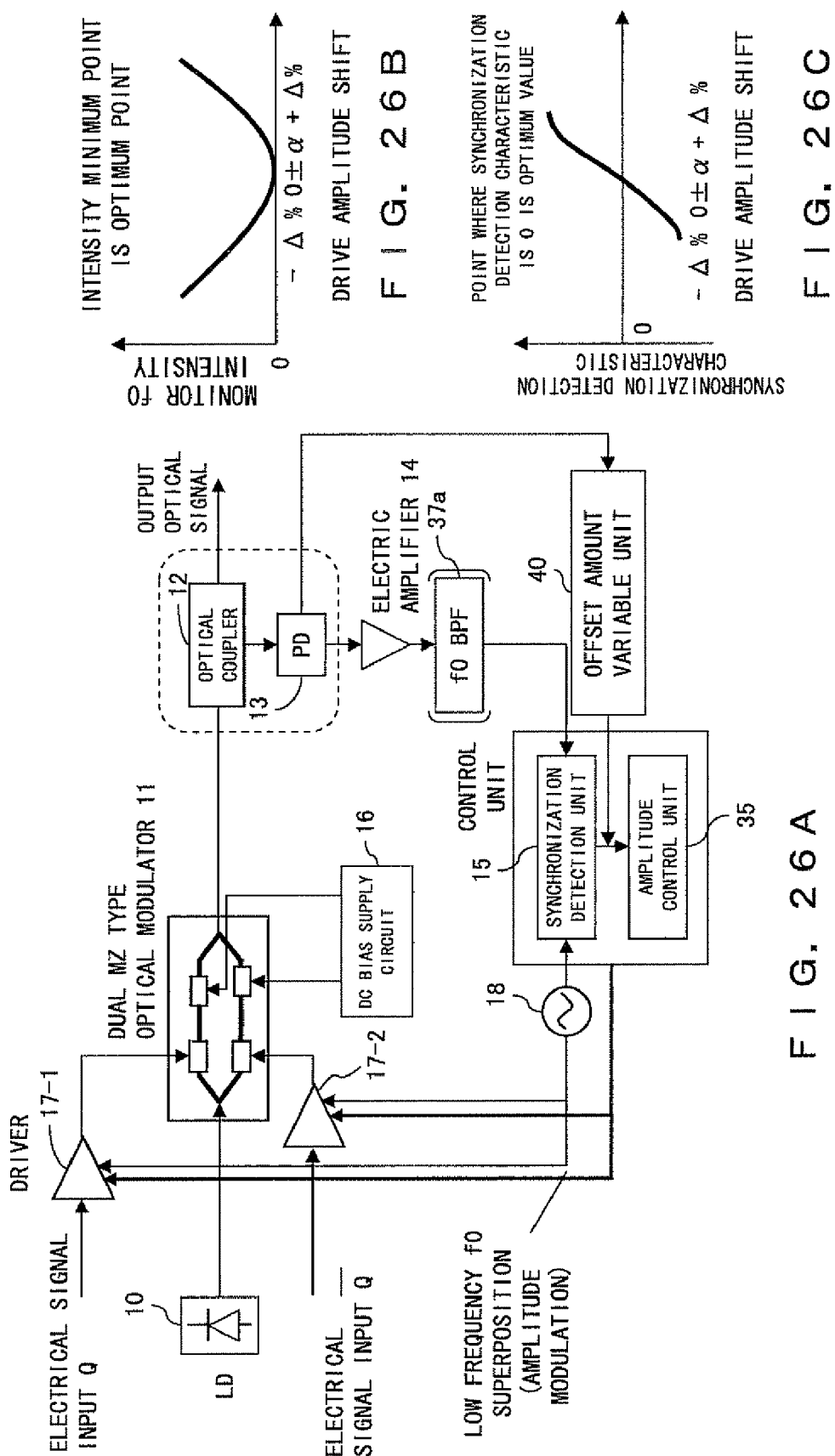

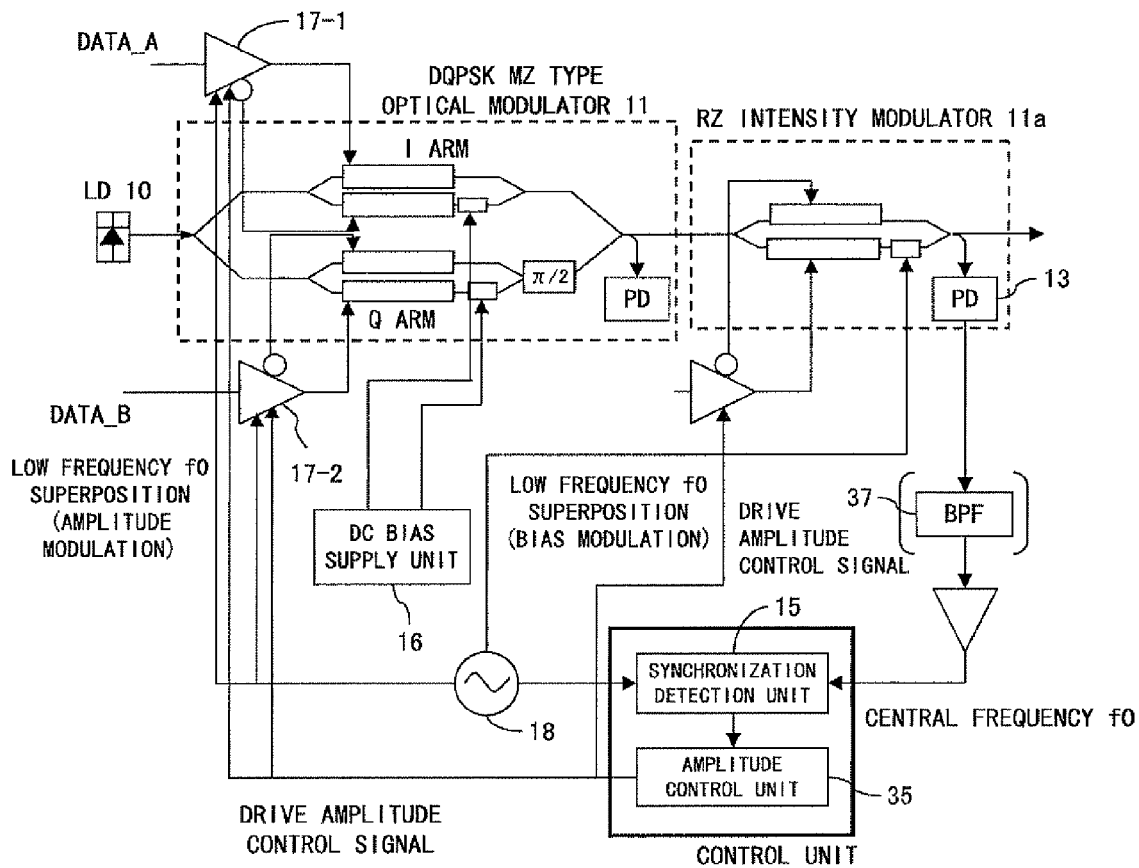
F I G. 27

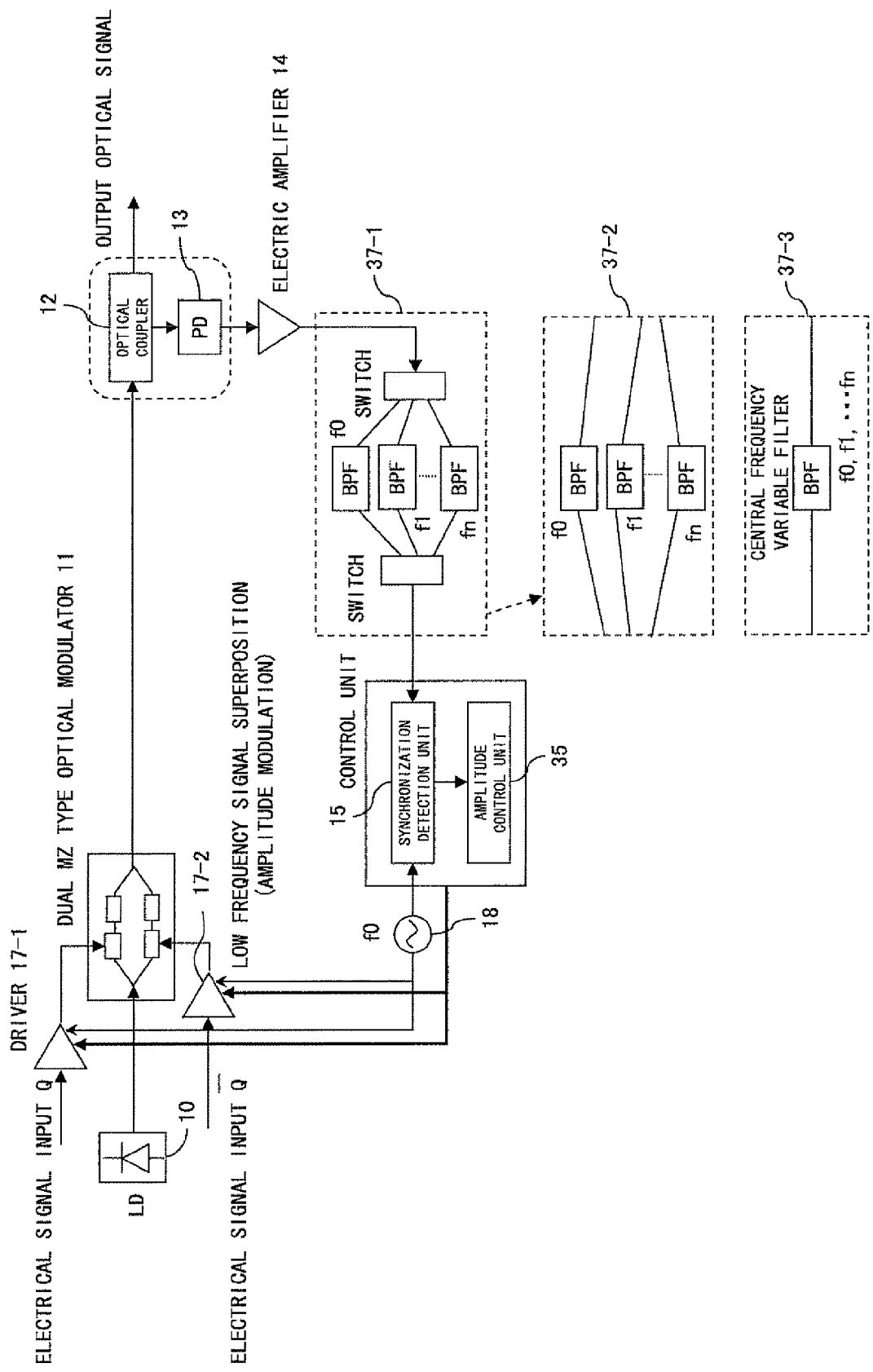
F I G. 31

OPTICAL TRANSMITTER

CROSS REFERENCE TO RELATED APPLICATIONS

The present application claims priority to Japanese Patent Application No. 2006-269362, filed on Sep. 29, 2006, the entire contents of which are hereby incorporated herein by reference.

BACKGROUND OF THE INVENTION

1. Field of the Invention

The present invention relates to an optical transmitter in an optical communication system.

2. Description of the Related Art

Recently, with an increasing demand for a 40 Gbit/s next-generation optical transmission system, a transmission distance and frequency use efficiency equivalent to a 10 Gbit/s system are demanded. As realizing means, various systems (duobinary, CS-RZ (carrier suppression-return to zero), DPSK (differential phase shift keying), DQPSK (differential quadrature phase-shift keying), etc.) that excel the NRZ modulation system (non return to zero) conventionally applied in the system of 10 Gb/s or less in frequency use efficiency, resistance to optical-signal-to-noise ratio, and resistance to nonlinearity have been studied actively.

Especially, the DQPSK modulation system simultaneously transmits two phase-modulated digital signals using optical light of one frequency. In this system, the pulse iteration frequency can be half (for example, 20 GHz) the data transmission rate (for example, 40 Gbit/s). Therefore, the signal spectrum width can be half the value in the conventional NRZ modulation system and the like, and excels in frequency use efficiency, resistance to wavelength dispersion, device transmission characteristic, etc. Accordingly, in the field of the optical transmission system, especially in the high-speed optical transmission system exceeding the data transmission rate of 40 Gbit/s, this modulation system is widely studied for implementation.

In the optical transmitter for realizing the high-speed optical transmission system, a Mach-Zehnder type LN modulator is used (non-patent document 1). The transmission unit in the optical transmission system using these units requires a stabilizing technology for the parts of the transmission unit for stabilizing an optical transmission signal.

For example, a stabilizing technology of for the parts of the transmission unit can be an automatic bias control (ABC) circuit for preventing the degradation of a transmission signal by the drift of an LN modulator in the NRZ modulation system adopted in the system operating on land or on the seafloor as a practical system (patent document 1 and the like). In the NRZ and RZ modulation systems, the modulation unit for performing modulation with an electrical signal having the amplitude of $V\pi$ using peak to valley or valley to peak of the drive-voltage-to-optical-intensity characteristic of the LN modulator is included. In the CS-RZ modulation system, the optical duobinary modulation system, the DPSK modulation system, and the DQPSK modulation system, the modulation unit for performing modulation with an electrical signal having the amplitude of $2\times V\pi$ ($V\pi$ indicates the voltage varying the phase of the modulator by $\pi$) using the peak, valley, and peak of the drive-voltage-to-optical-intensity characteristic is included.

FIG. 1 shows the configuration of realizing the LN modulator bias control by the $V\pi$ electrical signal drive. FIG. 2 shows the configuration of realizing the LN modulator bias control by the $V\pi$ electrical signal drive.

In the bias control device of (1) shown in FIG. 1, the light emitted from a laser diode 10 is input to a Mach-Zehnder (MZ) type modulator 11, intensity-modulated, and input to an optical coupler 12. In the optical coupler 12, a part of the light is branched, and received by a photodiode 13. The photodiode 13 converts an optical signal to an electrical signal, passes through an electric amplifier 14, and input to a synchronization detection unit 15. The synchronization detection unit 15 receives an oscillated wave from the oscillator of the low frequency f0, and the synchronization of a signal from the electric amplifier 14 is detected. A synchronization detection result is input from the synchronization detection unit 15 to a bias supply circuit 16. The bias supply circuit 16 performs bias control on the basis of the synchronization detection result. The low frequency f0 oscillated from an oscillator 18 is input to a modulator driver 17 with an electrical signal input Q, a drive signal obtained by superposing the low frequency f0 on the input signal Q is generated, and applied as the drive signal to the Mach-Zehnder type modulator 11.

(2) shown in FIG. 1 shows the input electrical signal and the characteristic of the MZ type modulator. The status of A is the optimum status of the bias, and (b) and (c) indicates the characteristic of the MZ type modulator when the bias voltage is shifted. In the status of the bias of (a) through (c), when a signal obtained by amplitude-modulating the low frequency signal having the frequency of f0 is input to the input electrical signal, the modulated optical signal indicated by (3) shown in FIG. 1 is obtained. In the optimum status of A, the low frequency component of the frequency f0 does not occur in the modulated optical signal. On the other hand, when the bias voltage of (b) and (c) is shifted, the low frequency component of the f0 component occurs in the modulated optical signal. The statuses (b) and (c) can be discriminated from each other by the 180° difference in phase of the low frequency component.

In (1) shown in FIG. 2, the same component as in (1) shown in FIG. 1 is assigned the same reference numeral, and the explanation is omitted here. In (1) shown in FIG. 2, the dual MZ type optical modulator is used, and the electrical signal inputs Q, Q– are applied to each of the two branched waveguides through the drivers 17-1 and 17-2. In this case, the bias voltage is changed at the low frequency of the frequency f0, and the fluctuation of the amplitude of the obtained optical signal is detected. As shown in (2) and (3) shown in FIG. 2, in A where the optimum bias voltage is obtained, no f0 component occurs in the output optical signal. However, when the bias voltage is shifted, the f0 component occurs in the output optical signal. (b) and (c) can be discriminated from each other by the difference in phase of the f0 component. Thus, FIG. 2 is basically the same as FIG. 1 except that the amplitude of the drive signal for driving the modulator is $2\times V\pi$ and that the low frequency signal is not superposed, but the bias voltage itself is modulated.

The control signal of the frequency of f0 is superposed on the amplitude or the bias of the drive signal. Then, when the bias is shifted from the optimum value, the f0 component occurs in the detection signal. Since the phase of the f0 component is inverted depending on the shift direction from the optimum bias point, the direction of the bias shift can be detected.

Furthermore, as another parameter that determines the quality of the optical transmitter, there is the drive amplitude of an LN modulator. The method of controlling the drive amplitude to $V\pi$ or $2\times V\pi$ is not specifically presented. In the present system, control is not specifically performed, but the unit variance of a device is regarded as a margin or the waveform of a high-speed optical signal is observed at the initial adjustment, thereby performing the adjustment. However, a measurement unit for monitoring the waveform of the high-speed optical signal is required for the latter, and a resultant adjustment system is costly.

The patent document 2 features an optical frequency change amount detection device for detecting the amount of change in optical frequency of the output light, and a device for adjusting the drive condition of the optical modulator such that the amount of fluctuation of an optical frequency can be the optimum.

The patent document 3 features the adjustment between the drive amplitude and the phase by a phase comparison circuit and a phase comparison circuit to minimize the optical wavelength chirp to be provided for the transmission optical signal.

[Non-patent Document 1] Magazine FUJITSU, 54, 4, p. 314-322 (07, 2003)

[Patent Document 1] Japanese Patent Application Publication No. H3-251815

[Patent Document 2] Japanese Patent Application Publication No. H11-30517

[Patent Document 3] Japanese Patent Application Publication No. 2002-23124

FIGS. 3A and 3B show an example of the configuration of performing modulation with electrical signals of the drive amplitude of $V\pi$ and $2\times V\pi$.

FIG. 3A shows the case in which the drive amplitude of $V\pi$ is used, and FIG. 3B shows the case in which the drive amplitude of $2\times V\pi$ is used. The configuration of the drive portion of $V\pi$ and $2\times V\pi$ included in each modulation system is unchanged. In each modulation system, when a shift from the optimum drive amplitude (level of drive amplitude) occurs by the variance of the electrical signal drive system, the degradation with time, and a temperature change, the quality of the transmission of an optical signal is degraded. Therefore, a configuration for monitoring the shift from the optimum point of the electrical signal drive amplitude, and controlling the electric drive signal amplitude is required.

FIGS. 4A and 4B are explanatory views using an example of calculating the degradation of the quality of a signal with respect to the drive amplitude. FIG. 4A shows the DQPSK optical transmitter used in the calculation. The signals of the data 1 and 2 output from the DQPSK signal source are amplified by the drivers 1 and 2, and drive the modulator. FIG. 4B shows the calculation result of the degradation of the quality of a signal with respect to the drive amplitude. The amount of degradation (Q penalty) of the signal quality is the lowest in the vicinity of $V\pi$, and the quality of a signal is degraded by a shift of the drive amplitude from the vicinity of $V\pi$ of the modulator. This tendency appears more conspicuously when the coding method is a multivalue method than it is a binary method. Since the binary coding method has conventionally been used, the signal degradation in an allowable range can be rejected in the multivalue coding method.

As described above, to suppress the degradation of the quality of a signal, it is necessary to adjust or control the drive amplitude of each driver to be set around the vicinity of $V\pi$ of each modulator. Especially, when the optical transmitter has a plurality of drivers for driving the modulators that are a plurality of Mach-Zehnder type modulators using a differential phase modulator when multivalue modulation such as the RZ-DPSK, the RZ-DQPSK, etc. is used, the adjustment is very hard. Therefore, a simple adjustment/control method is required.

However, there has not been any device for satisfying the above-mentioned requirements. In addition, as described above in the Description of the Prior Art, there is a bias control method, but the frequency f0 component of the control signal is constantly 0 (zero) regardless of the amount of drive signal amplitude. Accordingly, it cannot be applied to amplitude control of a drive signal.

SUMMARY OF THE INVENTION

The present invention aims at providing an optical transmitter having the optical modulator control mechanism for preventing the degradation of a signal with accuracy.

The optical transmitter according to the present invention is an optical transmitter having the configuration for controlling the amplitude of a drive signal to be provided for the optical modulator, and includes: an optical detection device for detecting an output optical signal of the optical modulator, and acquiring information about the intensity of an optical signal; and an amplitude adjustment device for adjusting the amplitude of the drive signal to be provided for the optical modulator in accordance with the information about the intensity of the optical signal.

According to the present invention, the shift (level of the drive amplitude), caused by the variance of the electrical signal drive system, the degradation with time, and a temperature change, from the optimum value (vicinity of $V\pi$) of the drive amplitude in the driver for driving the Mach-Zehnder type modulator can be reduced, and the degradation of the quality of a transmission signal can be suppressed.

BRIEF DESCRIPTION OF THE DRAWINGS

FIGS. 4A and 4B are explanatory views of an example of calculating the degradation of the quality of a signal;

FIGS. 6A through 6C show the relationship between the drive amplitude and the optical power of the optical transmitter for explanation of the principle of the present invention;

FIGS. 7A through 7C show the effect of the first mode for embodying the present invention;

FIGS. 15A through 15C are views (2) showing the relationship between the drive signal amplitude and a detected change in f0 signal component for explanation of the principle of the seventh mode for embodying the present invention;

FIGS. 16A and 16B show a simulation result of the seventh mode for embodying the present invention;

FIGS. 19A and 19B are views (2) showing the relationship between the drive signal amplitude and a detected change in f0 signal component for explanation of the principle of the eighth mode for embodying the present invention;

FIGS. 22A through 22C show the tenth mode for embodying the present invention;

FIGS. 24A through 24C show the relationship between the drive signal amplitude, a detected change in f0 signal component, and a detected change in 2×f0 signal component as the operation principle of the configuration shown in FIG. 22A for explanation of the principle of the seventh mode for embodying the present invention;

FIGS. 25A through 25C show the result of the simulation of the operation according to the ninth and tenth modes for embodying the present invention;

FIGS. 26A through 26C show an example of the configuration for providing an offset according to the eleventh mode for embodying the present invention;

FIG. 27 shows the twelfth mode for embodying the present invention showing the configuration to which the present invention is applied to a transmission unit for the RZ-DQPSK system;

FIG. 31 shows an example of the configuration of the monitor unit for monitoring the process of superposing the low frequency signal when a plurality of low frequency signals of different wavelengths are used.

DESCRIPTION OF THE PREFERRED EMBODIMENT

In the present invention, in an optical transmitter having an optical modulators provided with one or more optical modulation units and a plurality of electric drive circuits for driving the optical modulators, the output amplitude of the drive circuits is feedback-controlled or adjusted such that the optical output power monitored at the output terminal of the optical transmitter can be the maximum.

Otherwise, in an optical transmitter having an optical modulators provided with one or more optical modulation units and a plurality of electric drive circuits for driving the optical modulators, the electric drive signal amplitude corresponding to the modulation system for detecting a change in monitor signal component using a low frequency pilot signal and performing modulation with the electric drive signal amplitude corresponding to 2×Vπ of peak, valley, and peak in the bias-to-optical-intensity characteristic of the Mach-Zehnder type LN modulator, and the modulation system for performing modulation with the electric drive signal amplitude corresponding to Vπ of peak and valley or valley and peak in the bias-to-optical-intensity characteristic of the Mach-Zehnder type LN modulator is feedback-controlled or adjusted.

The present invention realizes the control of the drive amplitude optimum point of the modulation unit using the 2×Vπ, which has not been conventionally used, as drive amplitude. Additionally, since the function is realized by the configuration substantially the same as the configuration applied to the LN modulator bias control, the modulation unit requiring both drive amplitude control and DC bias control such as the RZ-DQPSK modulation unit, etc. can share a control monitor unit, the addition of the device for the control can be minimized, and a small and low-cost configuration can be realized.

Figure 5:
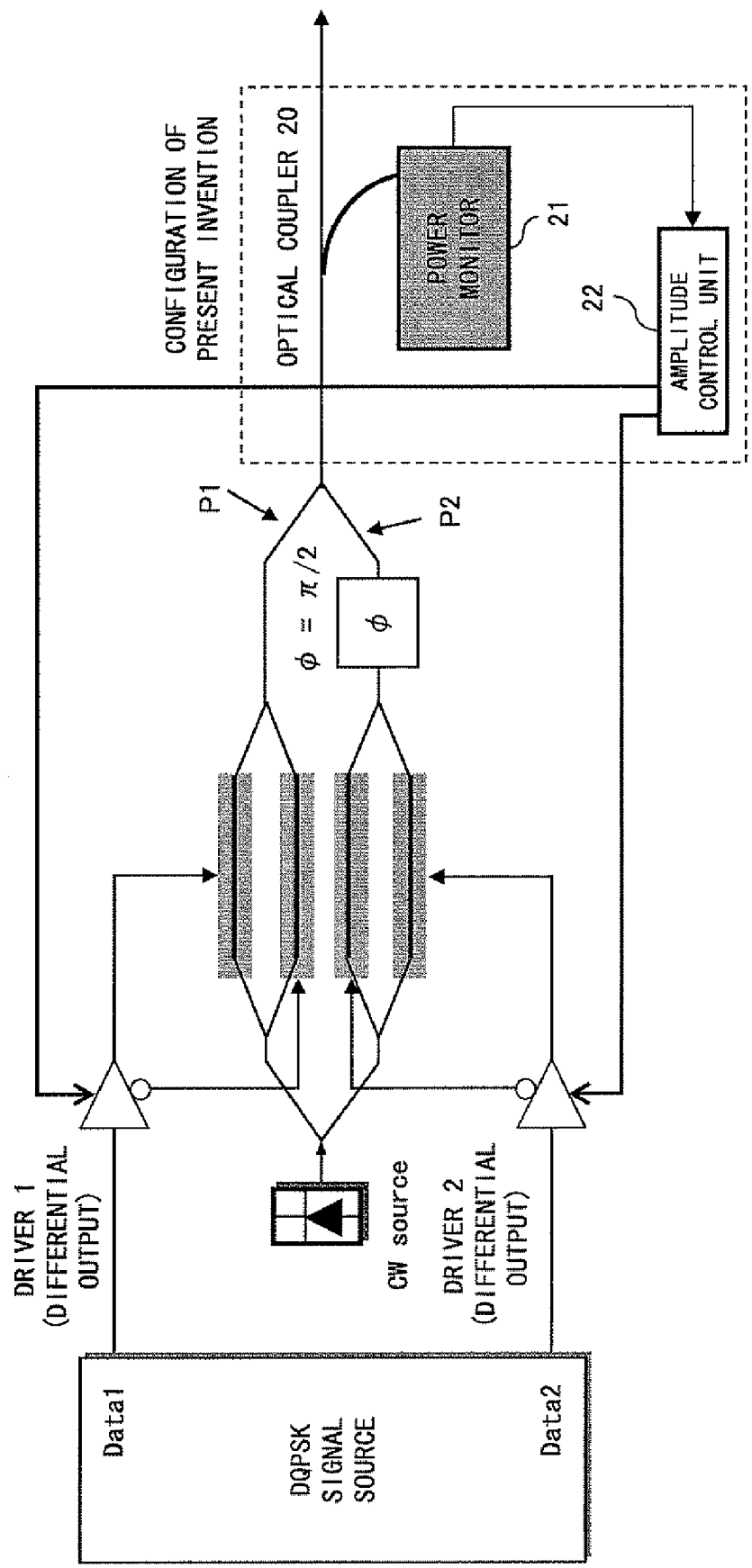
FIG. 5 shows the first mode for embodying the present invention.

FIG. 5 shows the first mode for embodying the present invention.

In this mode, an example of a transmitter using a Mach-Zehnder type modulator is a transmitter using the DQPSK modulation system, but the present invention can be applied not only to this modulation system, but also to other modulation systems such as the CS-RZ modulation system and the optical duobinary modulation system in addition to the NRZ and RZ modulation system, and the phase modulation system including the DPSK modulation system, etc. The signals of the data 1 and data 2 output from the DQPSK signal source are amplified by the driver 1 and the driver 2, and drive the modulator. The drivers 1 and 2 is configured to perform a differential operation. Assume that the voltage at which the phase of the modulator can be changed by π is Vπ. The optical signal output from the CW (continuous wave) source is modulated by the modulator, and reaches an optical coupler 20 of the output unit of the transmitter. The average optical power is monitored by a power monitor 21, and the monitor result is used by an amplitude control unit 22 when the output of the drivers 1 and 2 is controlled such that the optical power of the output of the transmitter can be the maximum. As a result, the drive amplitude of the drivers 1 and 2 is controlled such that the output power of the transmitter can be the maximum. Therefore, the drive amplitude approaches Vπ.

FIGS. 6A through 6C show the relationship between the drive amplitude and the optical power of the optical transmitter for explanation of the principle of the present invention. Assume that the bias voltage of the modulator is constant. FIGS. 6A through 6C show the relationship among the phase shift status with respect to the drive amplitude, the DQPSK modulation waveform, and the average power. When the drive amplitude is lower or higher than Vπ, as clearly shown in FIGS. 6A through 6C, the average power is lower than when the drive amplitude is Vπ. Therefore, if the average power is the maximum, the drive amplitude can be adjusted close to Vπ.

When the abovementioned control of the present invention is performed, it is desired that the bias voltage of the modulator is controlled at the optimum value, and it is desired to control the drive amplitude after the control of the bias voltage is sufficiently stabilized. When the control of the bias voltage and the control of the drive amplitude are performed together, it is desired that the control of the drive amplitude and the bias voltage is performed on the basis of a time division manner, and the control period of the drive amplitude is longer than the control period of the bias voltage control. When the amplitude of the drivers 1 and 2 is controlled, the control can be performed in a time division manner with higher accuracy.

FIGS. 7A through 7C show the effect of the control performed with the above-mentioned configuration. As explained above, the calculation result of the value of the optical power monitor with respect to the drive amplitude is shown using the DQPSK optical transmitter as an example. The optical signal causes a change in amplitude at a very high transmission rate, but the optical power monitor detects the average optical power. FIGS. 7A and 7B show that the drive amplitude of the drivers 1 and 2 indicates the maximum optical power in the vicinity of Vπ. FIG. 7C shows the output optical power of the transmitter when the horizontal axis indicates the drive amplitude of the driver 1 (ratio to Vπ), and the vertical axis indicates the drive amplitude of the driver 2 (ratio to Vπ). It is apparent that the optical power is the maximum when drivers 1 and 2 indicate the values close to Vπ. Therefore, the drive amplitude of the driver can be controlled close to Vπ by monitoring the optical power and set to the maximum value. Accordingly, the quality degradation (Q penalty) of a signal caused by the shift of the drive amplitude or a driver from the vicinity of Vπ can be reduced.

Figure 8:
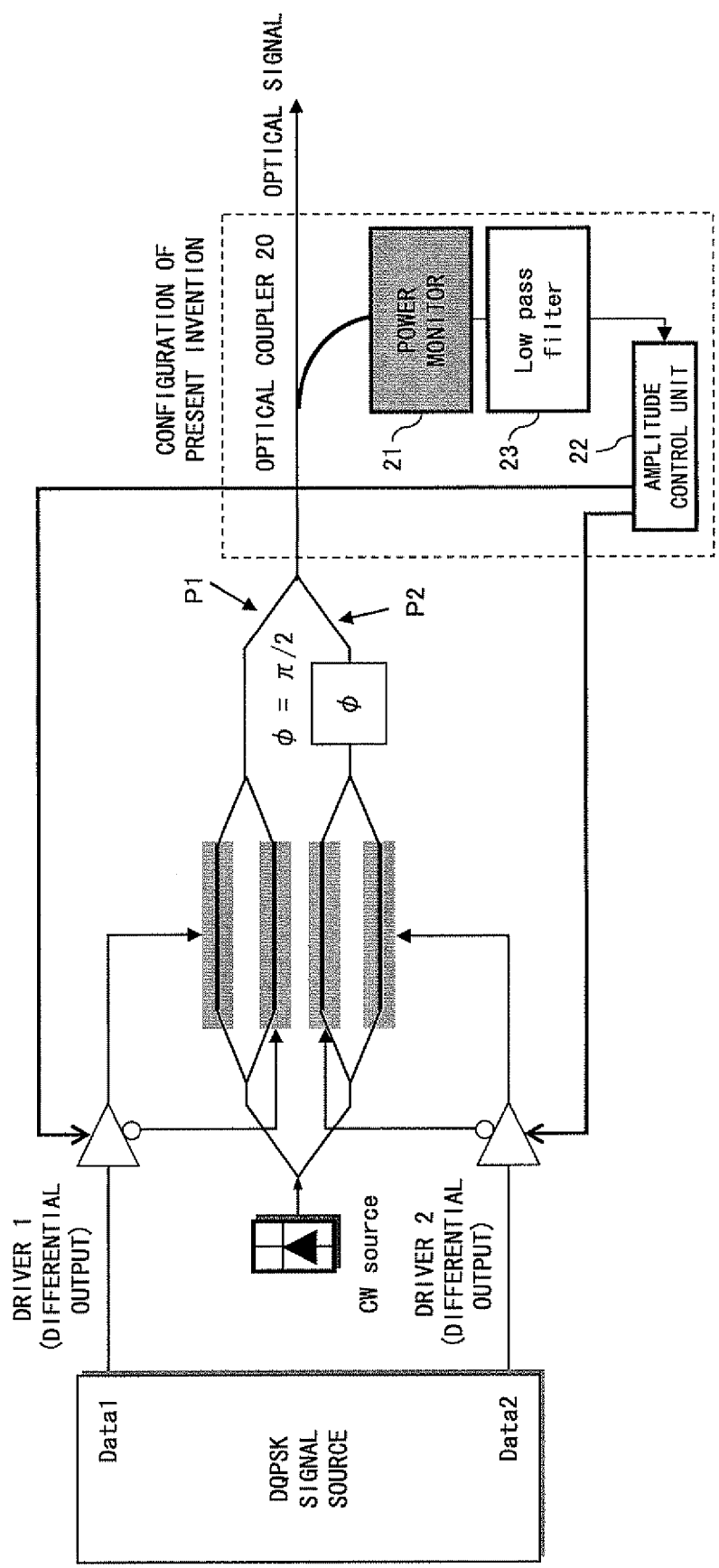
FIG. 8 shows the second mode for embodying the present invention.

FIG. 8 shows the second embodiment of the present invention. When the power is monitored in the state in which the bias voltage control, and when the conventional system is used in performing the bias voltage control, the frequency component of the superposition signal of the bias voltage control circuit becomes noise. Therefore, in the mode for embodying the present invention, the output control of the drivers 1 and 2 is performed after removing the frequency component to be superposed in the bias voltage, etc. using a low pass filter. Since the component of the control signal of the bias voltage in the bias voltage control can be removed, the monitor accuracy can be improved.

Figure 9:
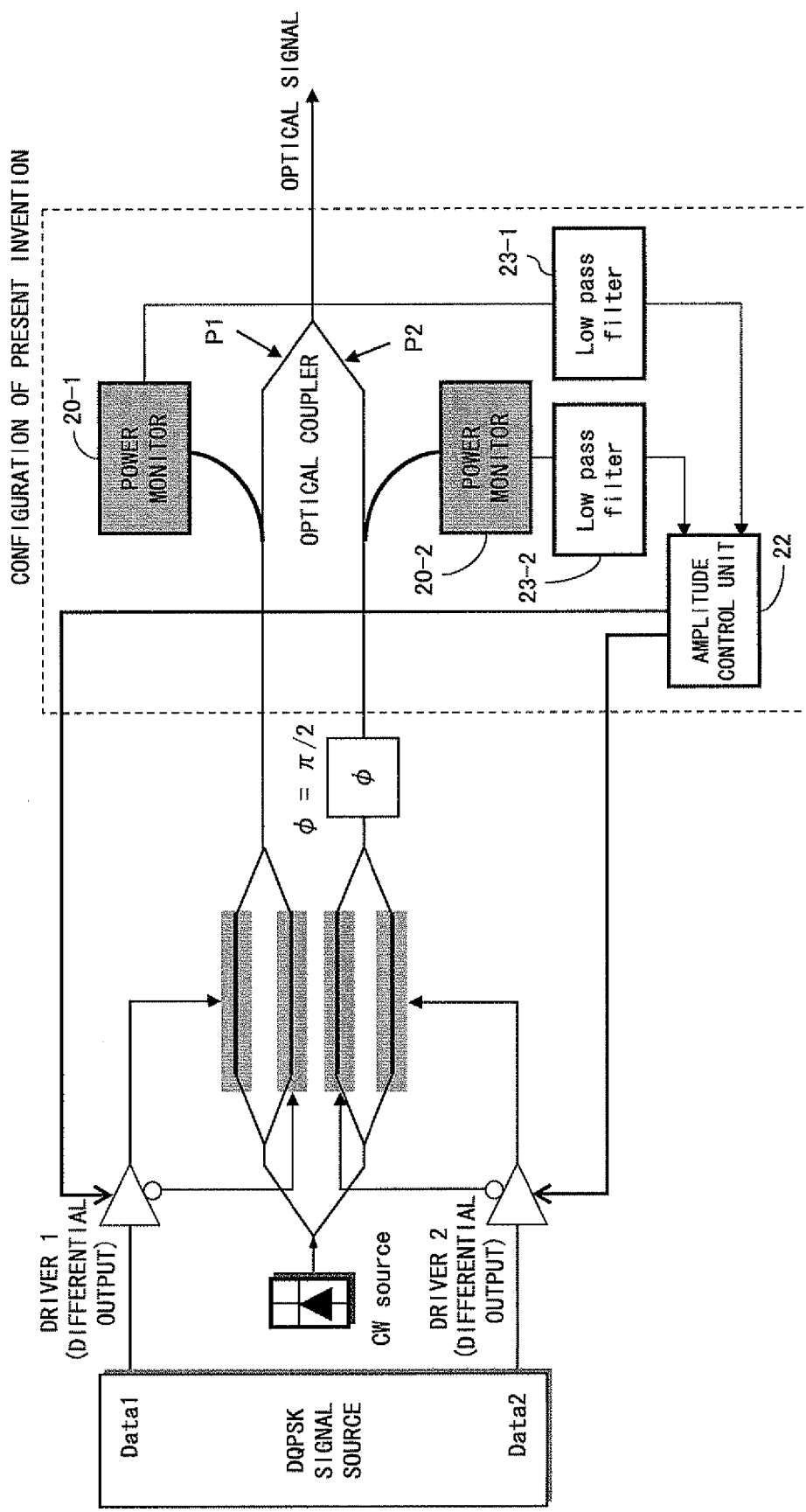
FIG. 9 shows the third mode for embodying the present invention.

FIG. 9 shows the third mode for embodying the present invention. With the configuration, power is monitored by each arm and the drive amplitude of the driver is controlled by each monitor value by setting in each arm the power monitors 20-1 and 20-2 mounted on the transmitter output unit. Thus, the amplitude control of the drivers 1 and 2 can be simultaneously performed. In this case, as shown in FIG. 8, the frequency component superposed by the bias control circuit and the like is removed by the low pass filters 23-1 and 23-2 or the like.

Figure 10:
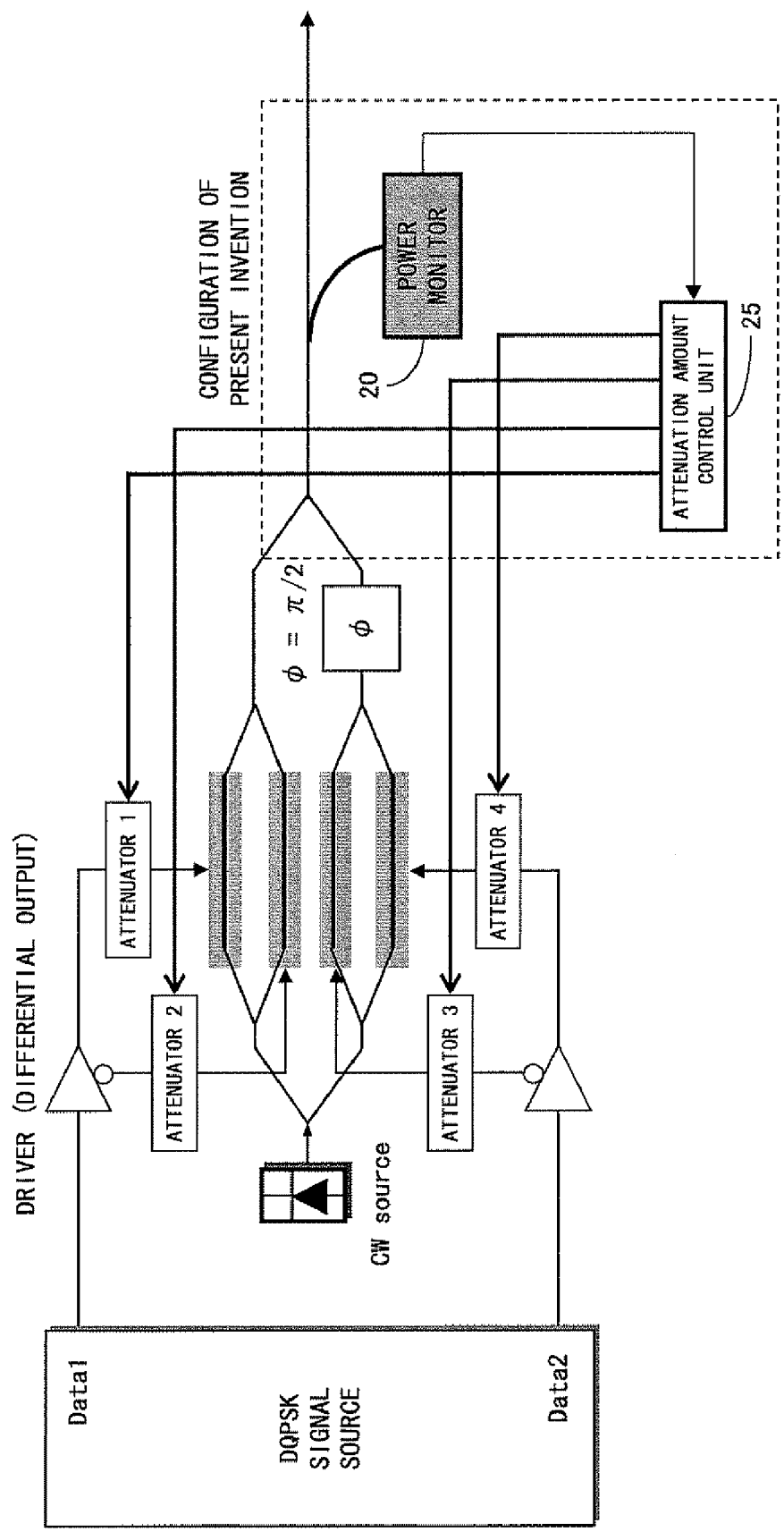
FIG. 10 shows the fourth mode for embodying the present invention.

FIG. 10 shows the fourth mode for embodying the present invention. With this configuration, the amplitude adjustment of the drivers 1 and 2 is performed by the attenuators 1 through 4. With the configuration, the optical power of the transmitter output in the bias voltage control state of the modulator is monitored by a power monitor 21, and the amount of the attenuation of the attenuators 1 through 4 connected to the output of the drivers 1 and 2 controlled by the attenuation controller 25 such that the optical power of the transmitter output can be the maximum.

Figure 11:
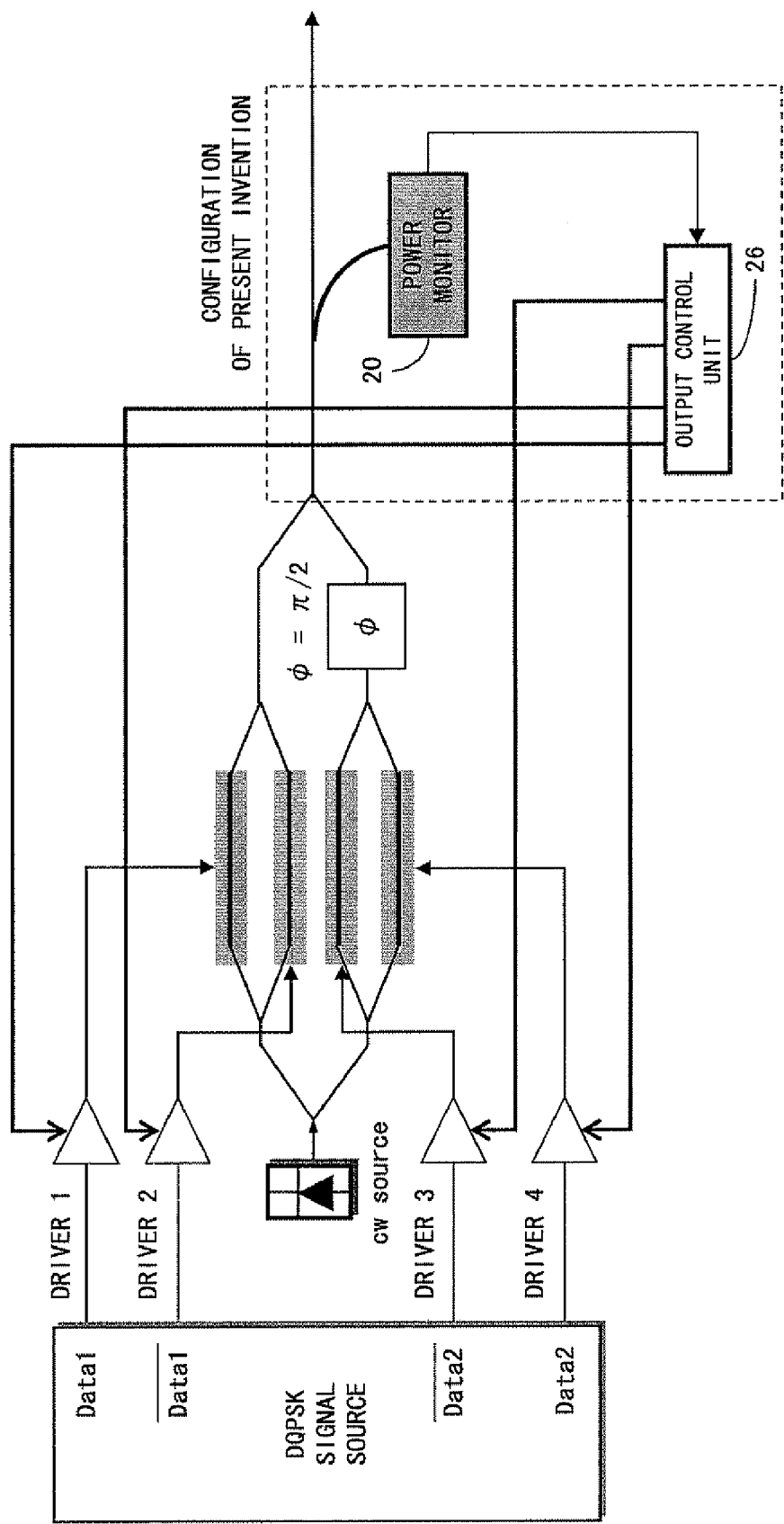
FIG. 11 shows the fifth mode for embodying the present invention.

FIG. 11 shows the fifth mode for embodying the present invention, With this configuration, the DQPSK signal source outputs Data1, Data1_Bar (inverse signal of Data1), Data2, and Data_Bar (inverse signal of Data2), and the output is amplified by the drivers 1 through 4 and drives the modulator. The power monitor 21 monitors the optical power of the transmitter output in the bias voltage control status of the modulator, and the output control unit 26 controls the output of the drivers 1 through 4 such that the optical power of the transmitter output can be the maximum.

Figure 12:
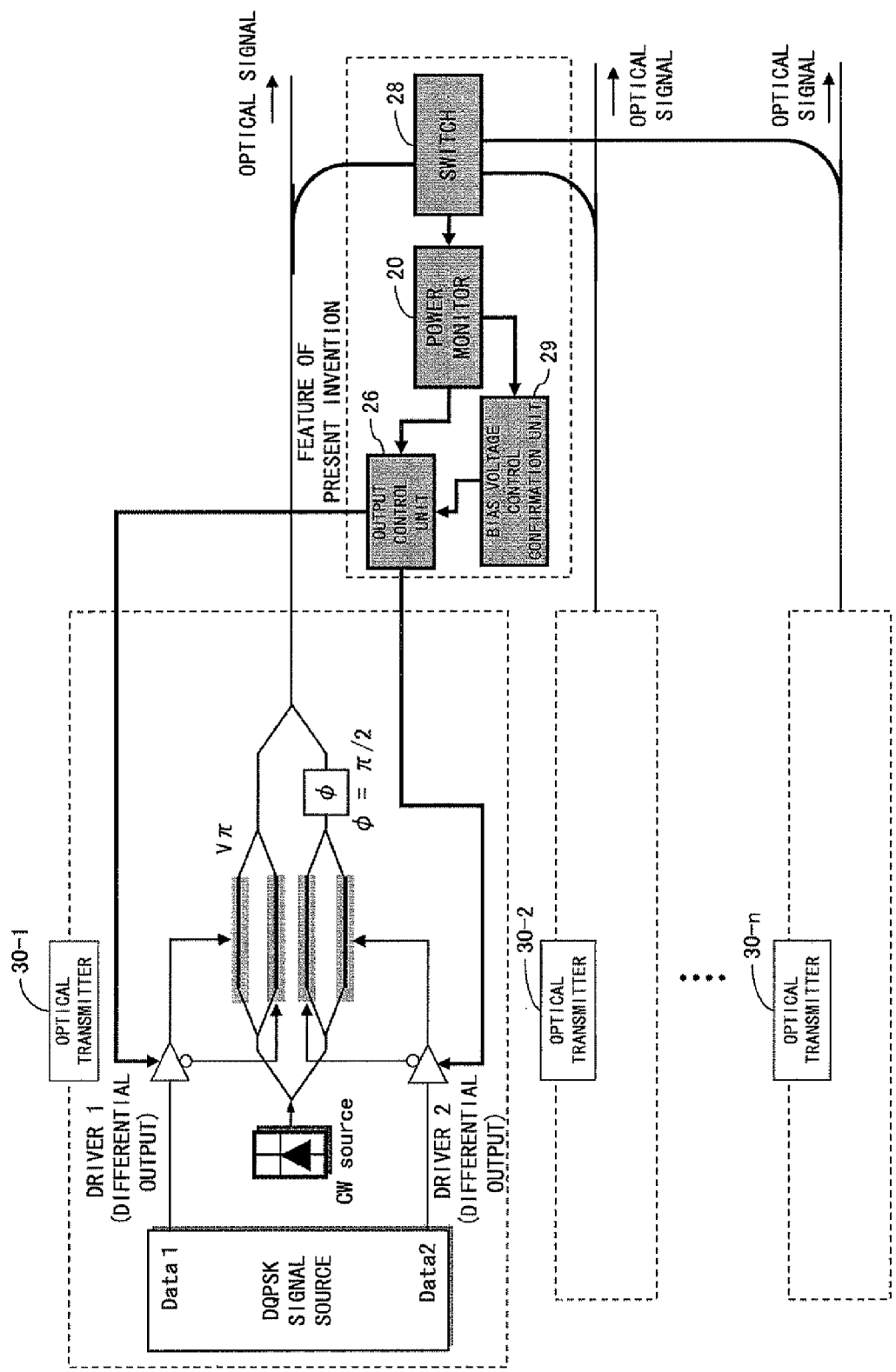
FIG. 12 shows the sixth mode for embodying the present invention.

FIG. 12 shows the sixth mode for embodying the present invention. With this configuration, one power monitor 21 monitors the optical power output from a plurality of transmitters 30-1 to 30-n while switching it using a switch 28, and the driver of each optical transmitter is controlled on the basis of the information such that the optical power of the output of each optical transmitter can be the maximum. The driver control is performed after the controller recognizes the state in which the bias voltage of the modulator of each optical transmitter is constantly controlled. That is, when a bias voltage control confirmation unit 29 performs bias control using a detection unit of the power monitor 21, and the bias indicates the optimum value, an output control unit 26 controls the drive amplitude.

Figure 1:
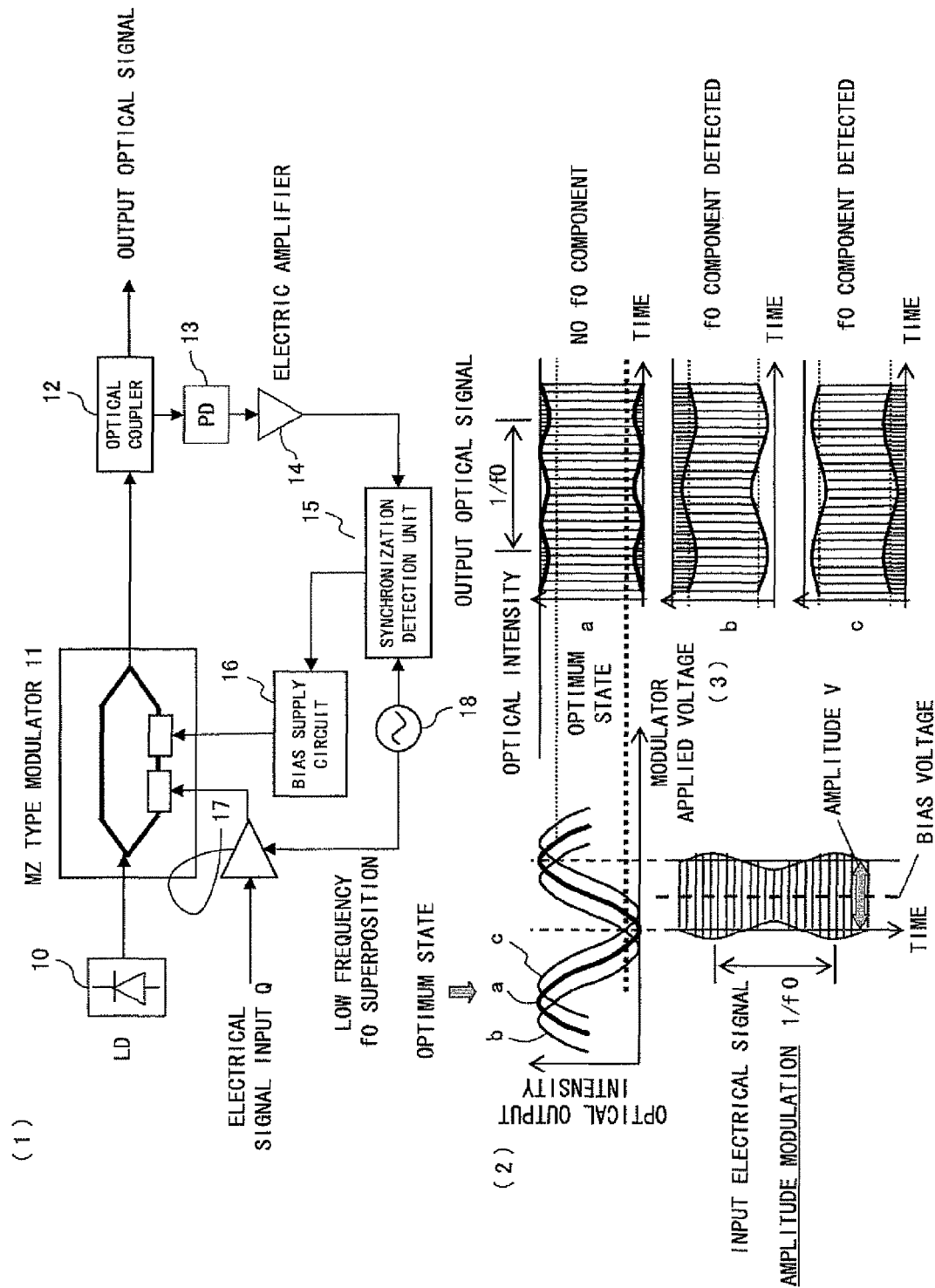
FIG. 1 shows the configuration of realizing the LN modulator bias control in driving a $V\pi$ electrical signal.
Figure 2:
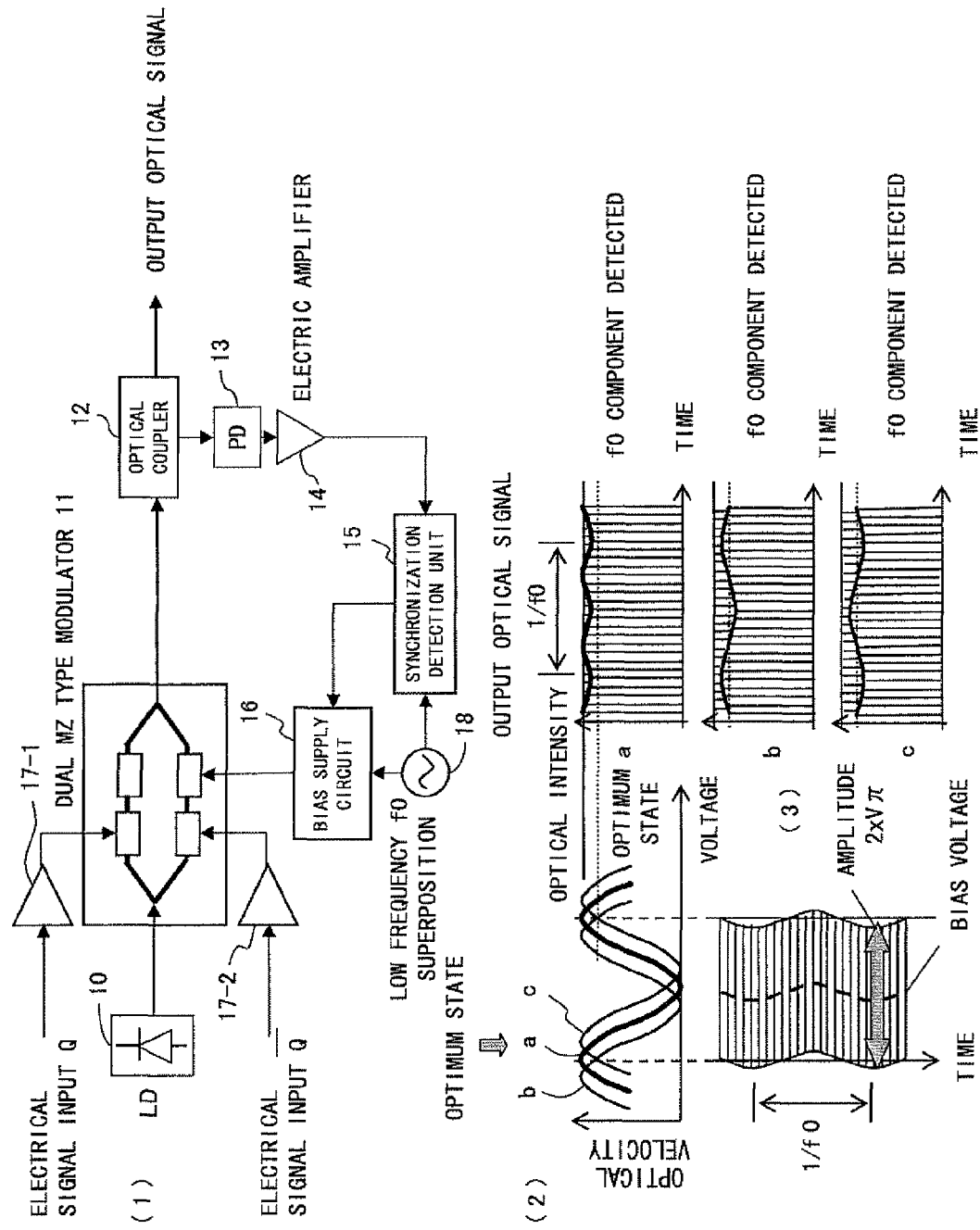
FIG. 2 shows the configuration of the LN modulator bias control in driving a $2\times V\pi$ electrical signal.
Figure 3A:
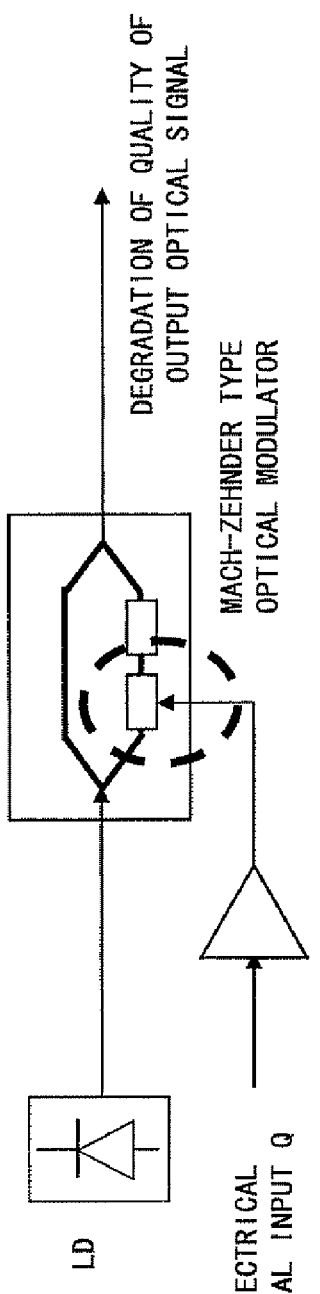
FIGS. 3A and 3B show an example of the configuration of performing modulation with an electrical signal of the drive amplitude of $V\pi$ and $2\times V\pi$.
Figure 3B:
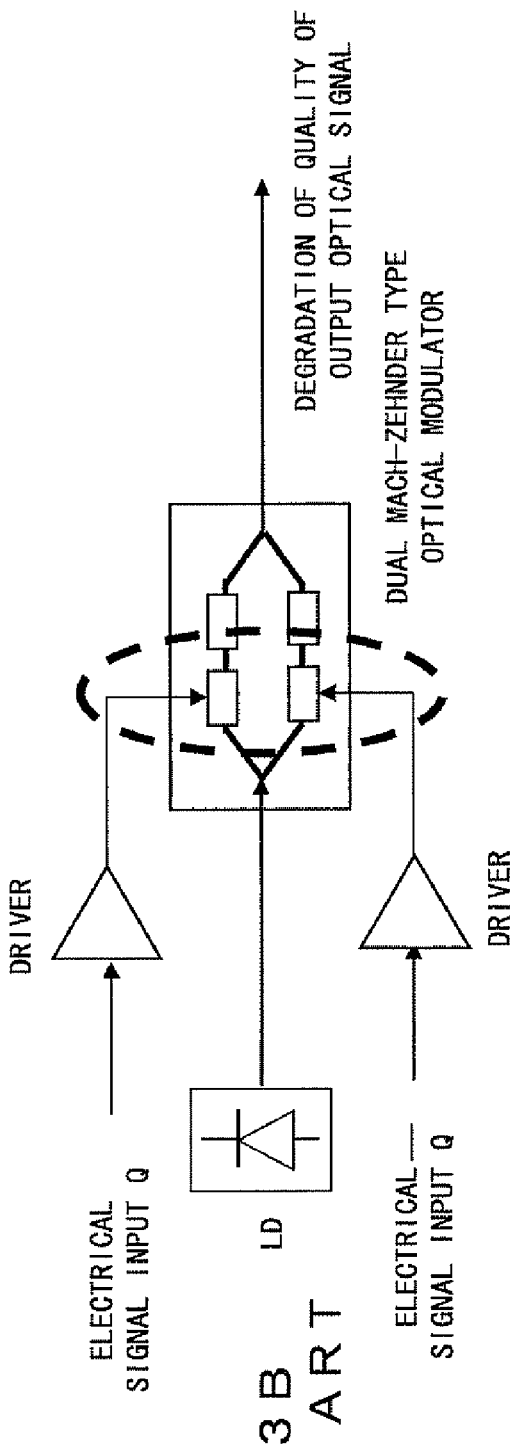
Figures 13A, 13B, 13C:
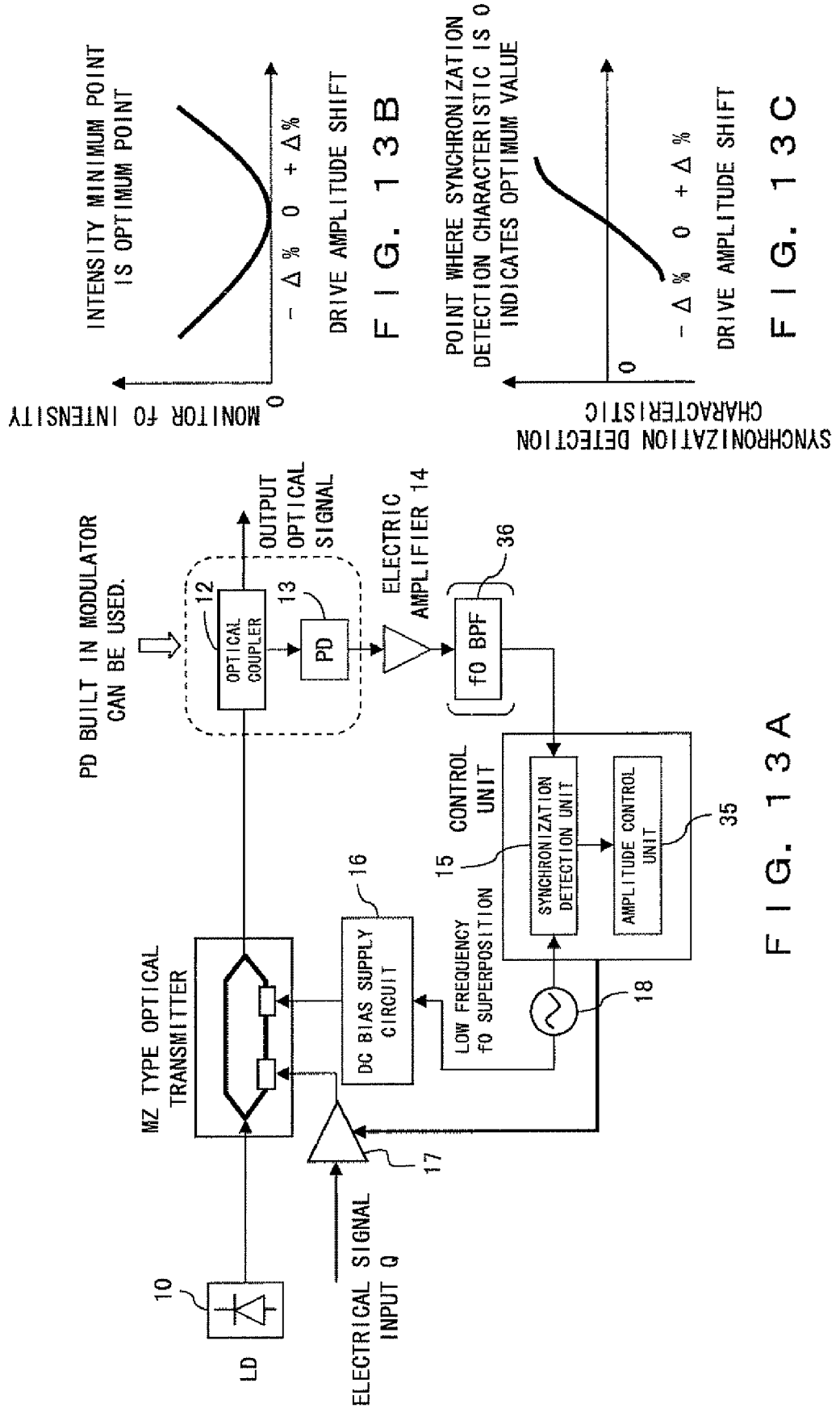
FIGS. 13A through 13C show the seventh mode (relating to the $V\pi$ drive amplitude) for embodying the present invention.

FIGS. 13A through 13C show the seventh mode (relating to the Vπ drive amplitude) for embodying the present invention. In FIG. 13A, the same configuration as in FIGS. 1 and 2 is assigned the same reference numeral, and the explanation is omitted here. In this configuration, the low frequency pilot signal f0 is superposed on the DC bias supply circuit 16 of the Vπ modulator. The optimum drive amplitude can be obtained by monitoring the f0 component in the detection signal and controlling the drive signal amplitude such that the signal component can be the minimum. At this time, it is assumed that the DC bias is the LN modulator indicating the substantially optimum point. The monitor unit (12, 13, 14, and 36) includes a photodetector (hereinafter referred to as a PD) built in or external to the LN modulator, an electric amplifier 14, a band pass filter (BPF) 36 having as a central frequency the f0 as necessary, an amplitude control unit (CPU, etc.) 35 for performing drive amplitude adjustment according to the signal extracted from it.

As shown in FIGS. 13B and 13C, the drive amplitude shift indicates 0 at the minimum intensity point as a result of monitoring the f0 component. When the synchronous detection characteristic is 0, the drive amplitude shift is 0.

Figure 14:
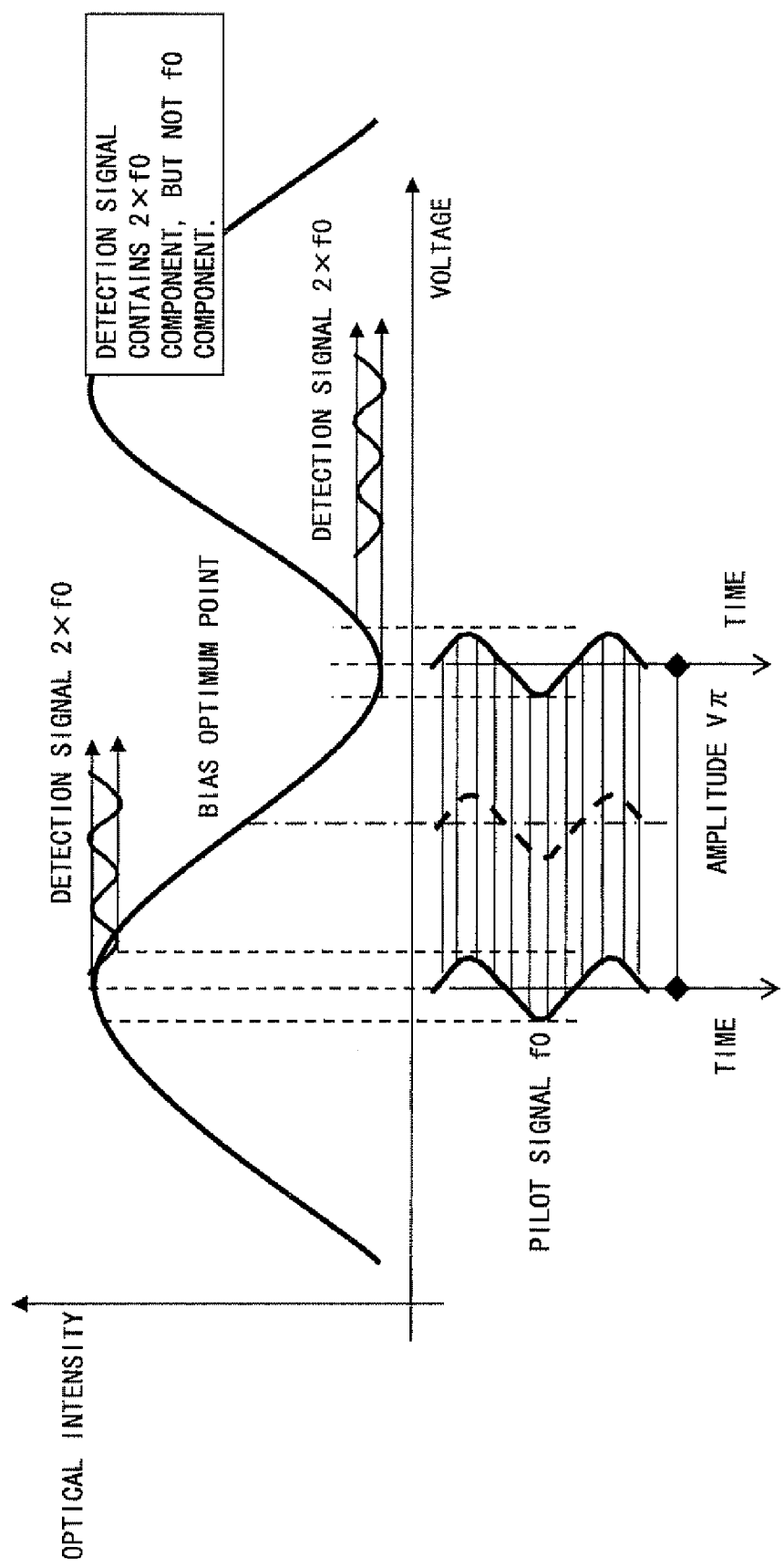
FIG. 14 is a view (1) showing the relationship between the drive signal amplitude and a detected change in f0 signal component for explanation of the principle of the seventh mode for embodying the present invention.

FIGS. 14 and 15A through 15C show the relationship between the drive signal amplitude and the change of a detected f0 signal component to explain the principle of the seventh mode for embodying the present invention. FIG. 14 shows the case in which the drive signal amplitude indicates the optimum value. The graph at the center of FIG. 14 shows the drive-voltage-to-optical-intensity characteristic of the LN modulator. The optimum point indicates the modulation with the drive signal amplitude Vπ using the peak and valley, or the valley and peak of the characteristic. The pilot signal f0 is superposed such that the DC bias can be changed. At this time, the central bias value is the optimum value at the center of the peak and valley or the valley and peak. When the drive signal amplitude is close to the Vπ of the LN modulator, the 2×f0 component is generated in the detection signal.

FIG. 15A shows the case in which the drive signal amplitude is larger value (+Δ) from the optimum value Vπ. FIG. 15B shows the case in which it is the smaller value (−Δ). When the drive amplitude is Vπ+Δ or the drive amplitude is Vπ−Δ, the 2×f0 component is not included in the monitor signal. FIG. 15C shows the synchronization detection result between the monitor f0 signal for the drive amplitude shift and the original pilot signal. Since the monitor signal indicates 0 (zero) at the optimum point, and has the polarity by the phase change before and after the optimum point, the shift direction can be confirmed while checking the polarity and the optimum point control can be performed. From the absolute value of the monitor signal, the drive amplitude can be set to the optimum value by performing control such that the monitor signal can be the minimum.

FIG. 16B shows the simulation result according to the seventh mode for embodying the present invention. FIG. 16A shows the configuration used in the simulation. In FIG. 16A, the same component as in FIG. 13A is assigned the same reference numeral, and the explanation is omitted here. FIG. 16B shows a simulation result, and shows the relationship between the relative intensity of the monitor f0 component detected by the monitor unit (12, 13, 14, and 16 (the band pass filter 36 can be provided or omitted)) and the drive amplitude shift for the Vπ. FIG. 16B shows that the drive amplitude shift is 0, that is, the drive amplitude is close to Vπ and the relative intensity of the f0 component is substantially 0. Therefore, the drive amplitude can be set to the optimum Vπ by controlling the drive amplitude such that the monitor intensity of the f0 component can be close to 0 (zero).

Figure 17B:
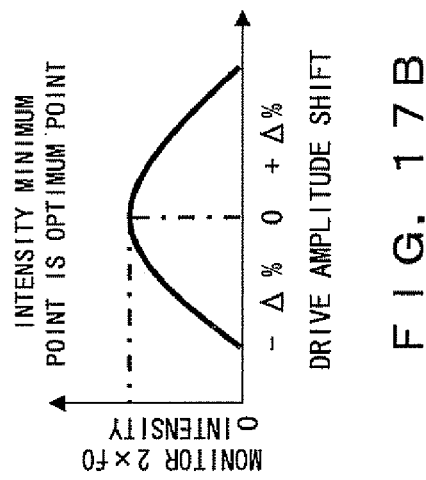
FIGS. 17A and 17B show the eighth mode for embodying the present invention (relating to the 2×Vπ drive amplitude)
Figure 17A:
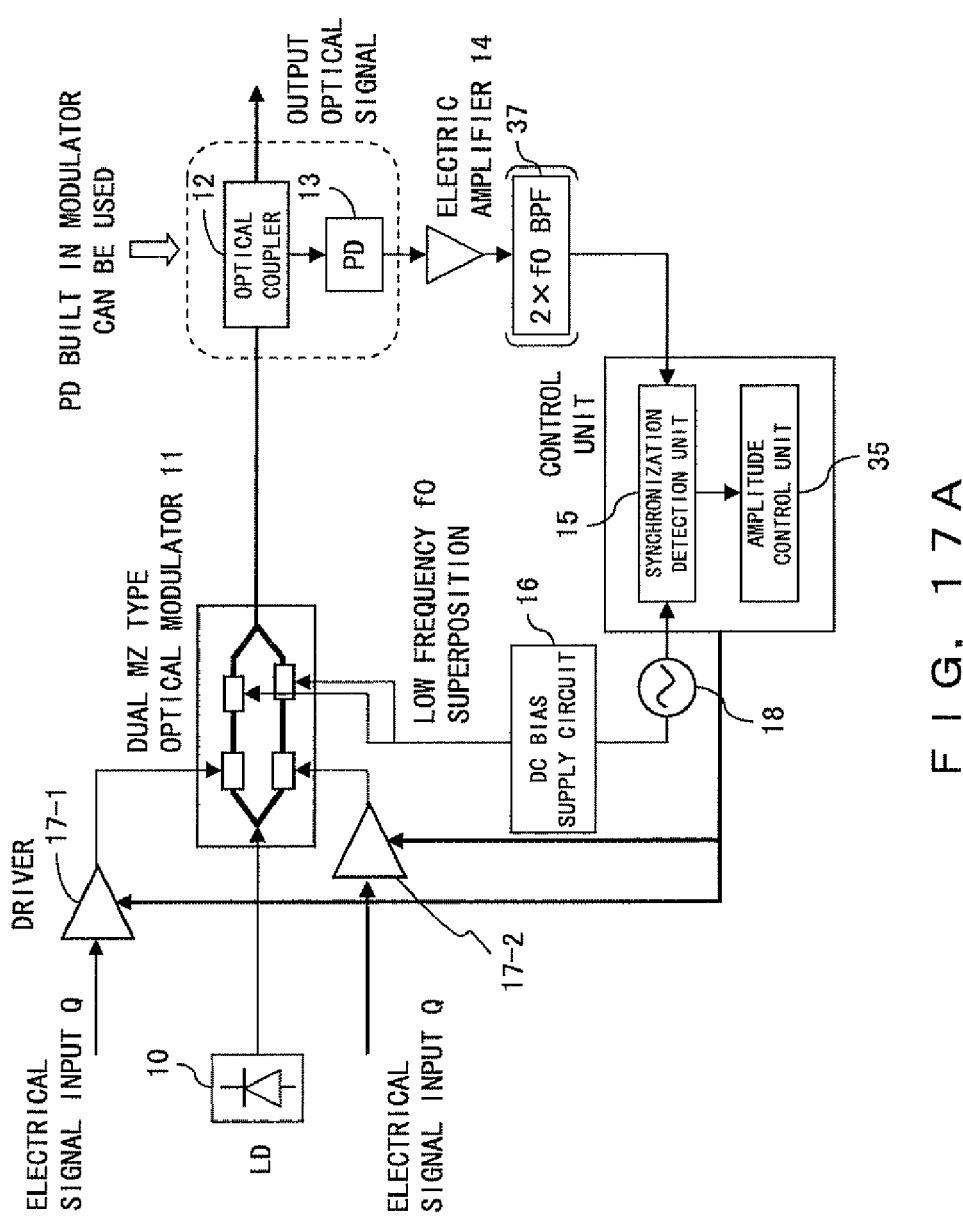

FIGS. 17A and 17B show the eighth mode (relating to the 2×Vπ drive amplitude) for embodying the present invention. In FIG. 17A, the same configuration as described in FIGS. 2 and 16A is assigned the same reference numeral, and the explanation is omitted here. With this configuration, the low frequency pilot signal f0 is superposed on the DC bias supply circuit 16 of the 2×Vπ modulation unit. The optimum drive amplitude can be obtained by monitoring the 2×f0 of the detection signal and controlling the drive signal amplitude such that the signal component can be the maximum. At this time, it is assumed that the DC bias is the LN modulator indicating the substantially optimum point. The monitor unit includes a photodetector (hereinafter referred to as a PD) 13 built in or external to the LN modulator, an electric amplifier 14, a band pass filter (BPF) 37 having as a central frequency the 2×f0 as necessary, a control unit (CPU, etc.) (15, 35) for performing drive amplitude adjustment according to the signal extracted from it. The control unit includes the synchronization detection unit 15 and the amplitude control unit 35. The synchronization detection unit 15 detects the 2×f0 component from the output of the modulator. The amplitude control unit 35 controls the drivers 17-1 and 17-2 and sets the drive amplitude to the optimum value. In the case shown in FIG. 17A, the drive amplitude is set to 2×Vπ. FIG. 17B shows the relationship in intensity between the drive amplitude shift and the 2×f0 component. As shown in FIG. 17B, when the 2×f0 component is the maximum, the drive amplitude shift is 0.

Figure 18:
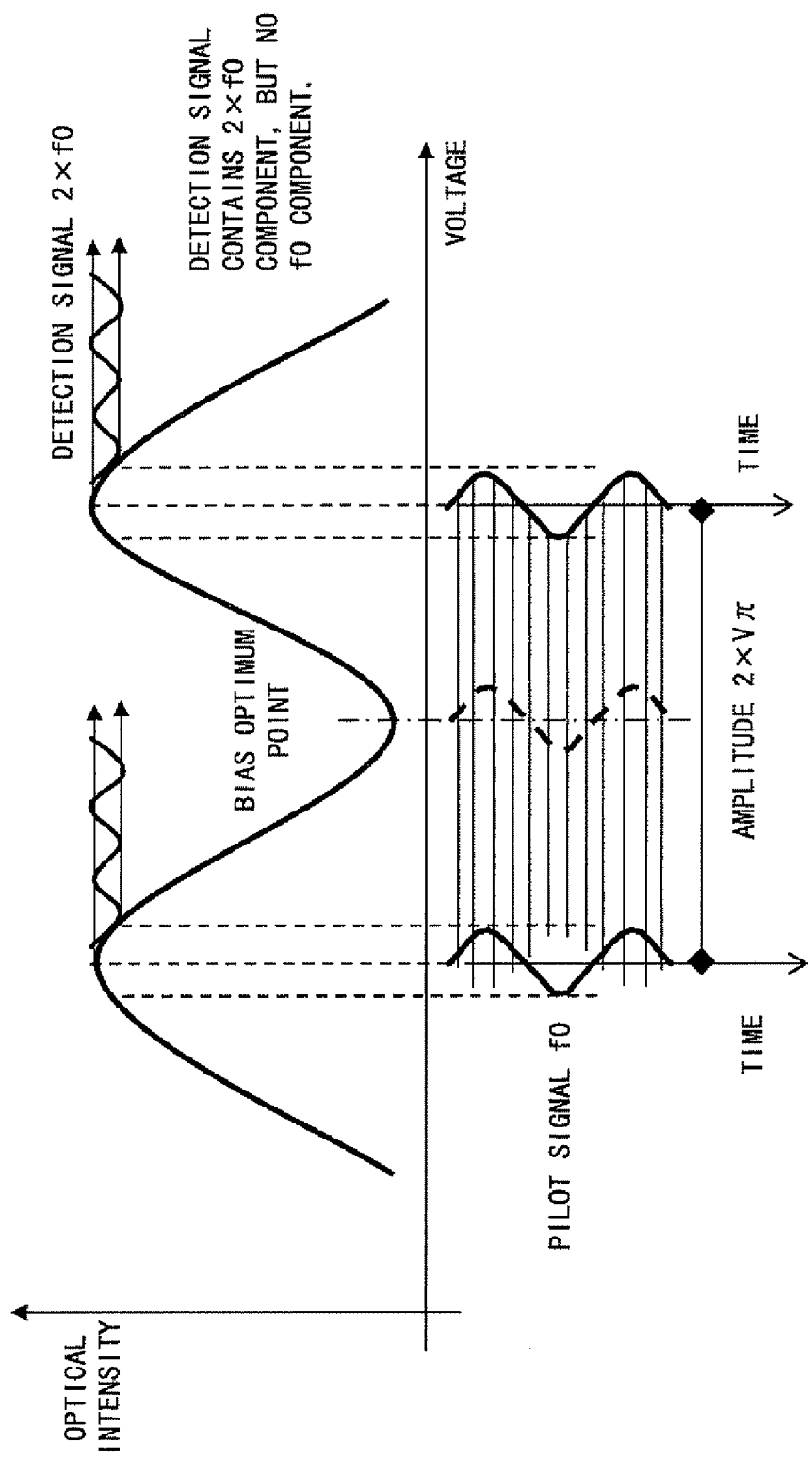
FIG. 18 is a view (1) showing the relationship between the drive signal amplitude and a detected change of the 2×f0 signal component for explanation of the principle according to the eighth mode for embodying the present invention.

For explanation of the principle of the eighth mode for embodying the present invention, FIGS. 18, 19A, and 19B show the relationship in change between the drive signal amplitude and the detected 2×f0 signal component. FIG. 18 shows the case where the drive signal amplitude is the optimum value. The graph at the center of FIG. 18 shows the drive-voltage-to-optical-intensity characteristic of the LN modulator. The modulation at the drive signal amplitude 2×Vπ using the peak, valley, and peak of the characteristic is the optimum point. The pilot signal f0 is superposed to change the LN bias. At this time, the central bias value is positioned at the center of the peak, valley, and peak as the optimum value. When 2×Vπ of the drive signal amplitude matches 2×Vπ of the LN modulator, the 2×f0 component occurs in the detection signal. FIG. 19A shows the case in which the drive signal amplitude becomes higher than the maximum value 2×Vπ (+Δ), and FIG. 19B shows the case in which it becomes lower than the value (−Δ). When the drive amplitude is 2×Vπ+Δ or 2×Vπ−Δ, the monitor signal does not contain the 2×f0 component. Thus, the optimum drive signal amplitude can be obtained by detecting the 2×f0 component in the monitor signal and adjusting the drive signal amplitude such that the value can be the maximum.

Figures 20A, 20B:
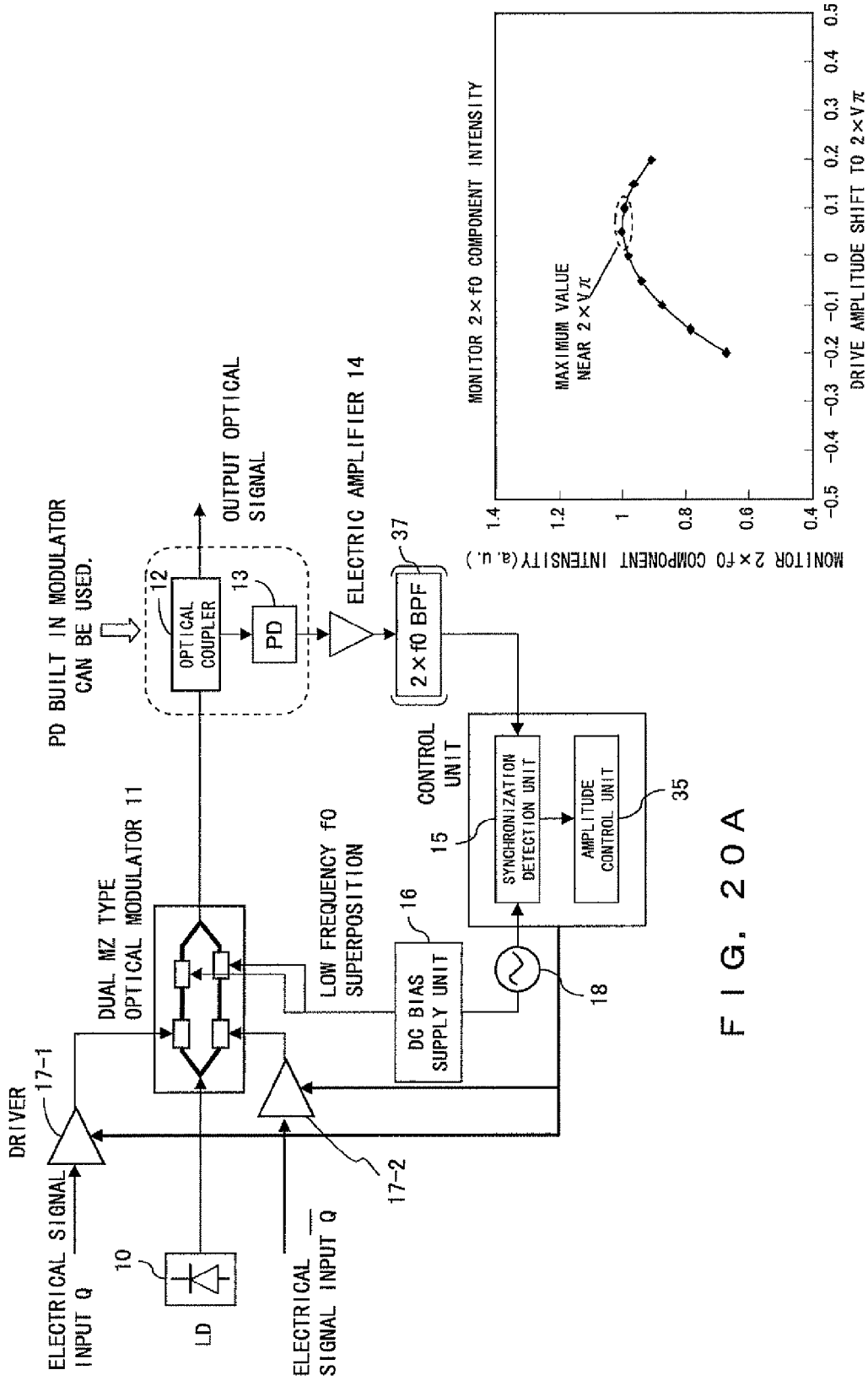
FIGS. 20A and 20B show a simulation result of the eighth mode for embodying the present invention.

FIG. 20B shows the simulation result according to the eight mode for embodying the present invention. FIG. 20A shows the configuration used in the simulation, and the same configuration as in FIG. 17A is assigned the same reference numeral. FIG. 20B shows the simulation result, and indicates the intensity of the monitor 2×f0 component for the drive amplitude shift with respect to 2×Vπ. As clearly shown in FIG. 20B, the drive amplitude shift is close to 0, that is, the drive amplitude is close to 2×Vπ, and the intensity of the 2×f0 component is maximum. Therefore, the drive amplitude can be the optimum by controlling the drivers 17-1 and 17-2 such that the 2×f0 component can be the maximum.

Figures 21A, 21B:
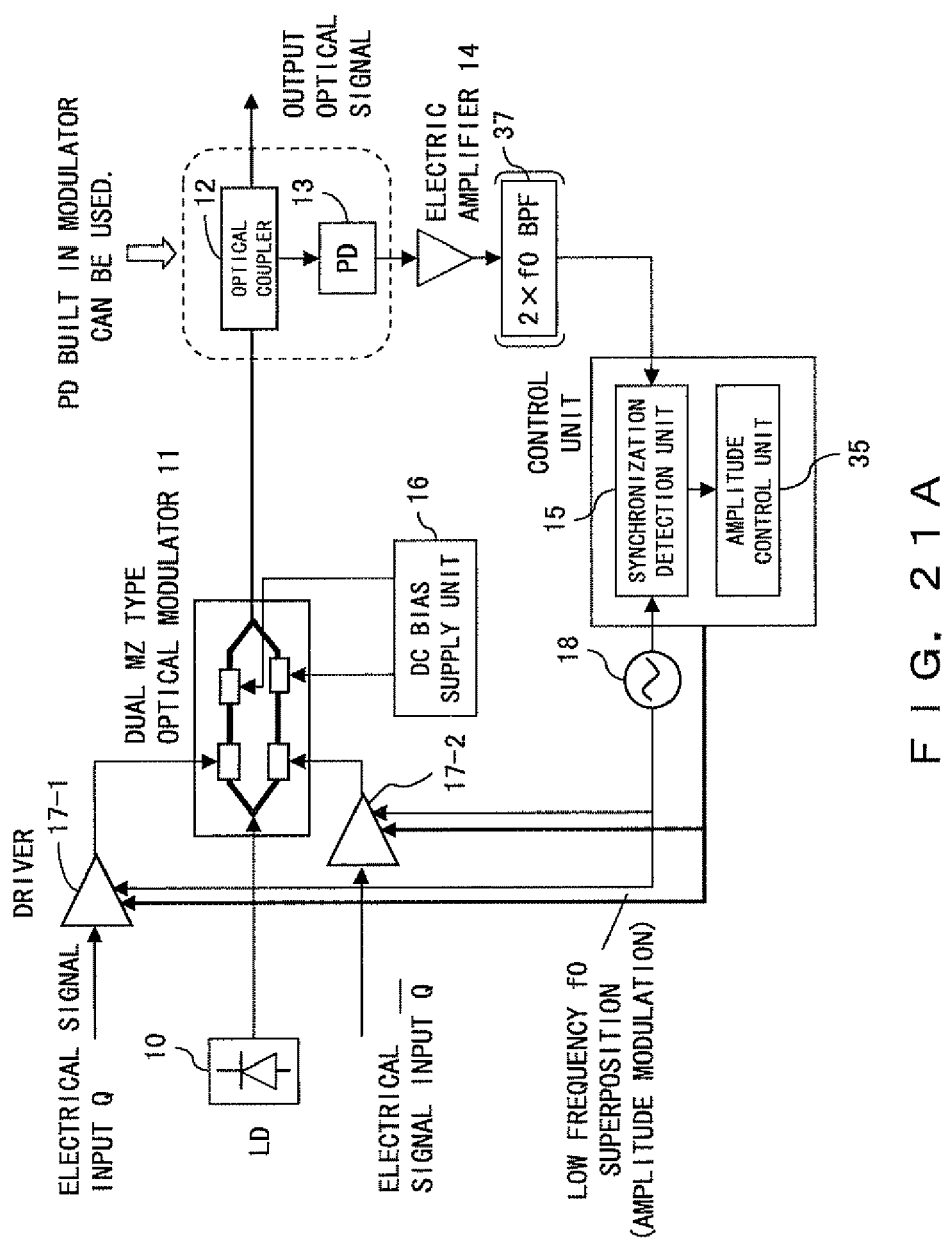
FIGS. 21A and 21B show the ninth mode for embodying the present invention.

FIGS. 21A and 21B show the ninth mode for embodying the present invention. FIGS. 22A and 22B show the tenth mode for embodying the present invention. In FIGS. 21A and 22A, the same configuration as in FIG. 17A is assigned the same reference numeral, and the explanation is omitted here. With the configuration, the low frequency pilot signal f0 is superposed on the drive signal of the 2×Vπ modulator (dual MZ optical modulator) such that the drive signal amplitude can be changed. With the configuration shown in FIG. 21A, the 2×f0 component in the detection signal is monitored as shown in FIG. 21B, and the drive signal amplitude is controlled such that the signal component can be the maximum, thereby obtaining the optimum drive amplitude. With the configuration shown in FIG. 22A, as shown in FIGS. 22B and 22C, the f0 component in the detection signal is monitored, and the drive signal amplitude is controlled such that the result obtained by performing the synchronization detection using the signal and the original pilot signal can be close to 0 (zero), thereby obtaining the optimum drive amplitude. Otherwise, the f0 component in the detection signal is monitored, and the drive signal amplitude is controlled such that the value can be the minimum. In each case shown in FIGS. 21A and 22A, it is assumed that the DC bias of the LN modulator indicates the optimum point. The monitor unit includes a photodetector (hereinafter referred to as a PD) 13, built in or external to the LN modulator, an electric amplifier 14, a band pass filters (BPF) 37 and 37a having as a central frequency the f0 or 2×f0 as necessary, a control unit (CPU, etc.) (15, 35) for performing drive amplitude adjustment according to the signal extracted from it.

Figures 23A, 23B:
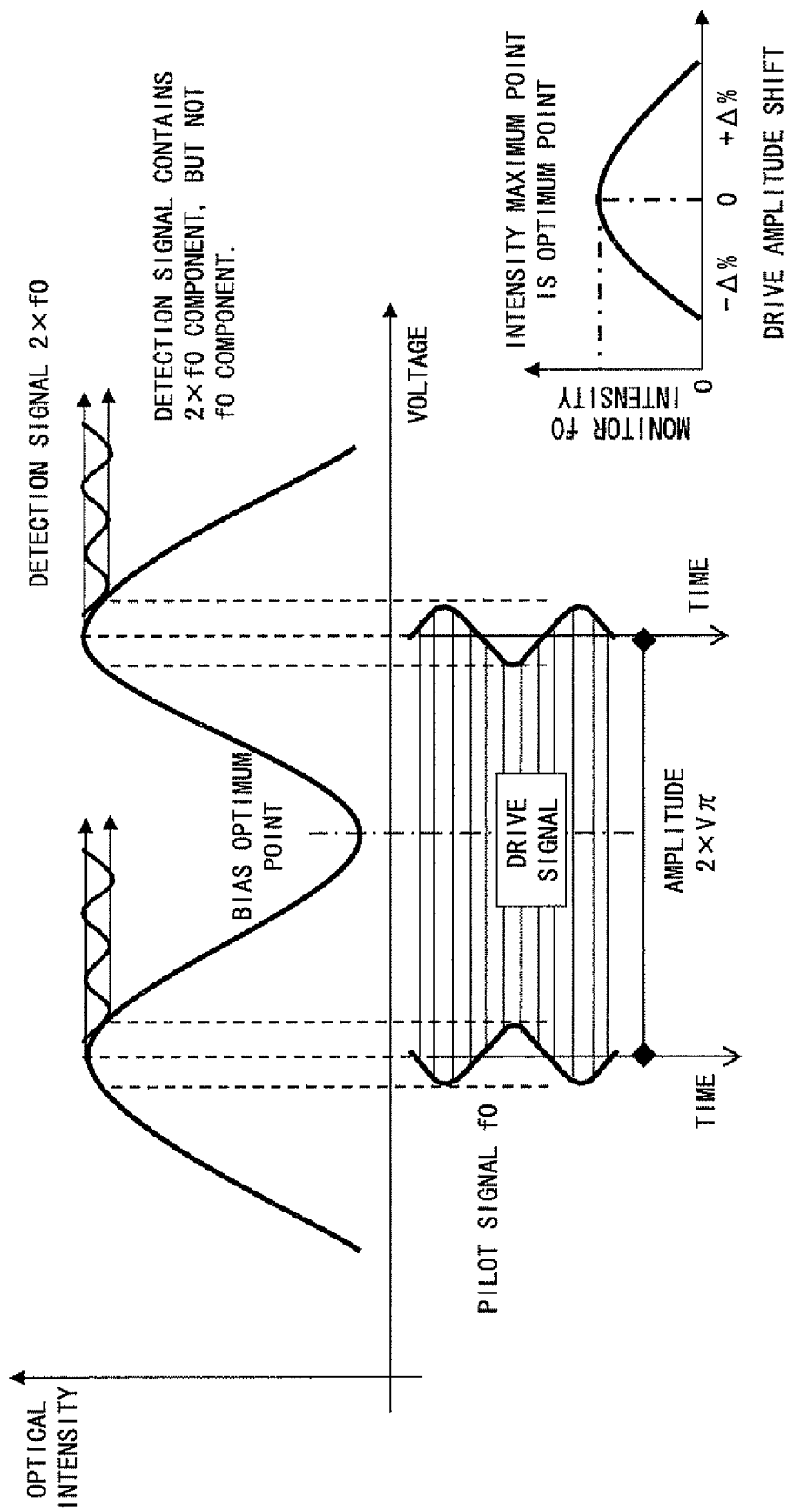
FIGS. 23A and 23B show the relationship between the drive signal amplitude, a detected change in f0 signal component, and a detected change in 2×f0 signal component as the operation principle of the configuration shown in FIG. 21A for explanation of the principle of the seventh mode for embodying the present invention.

FIGS. 23A and 23B, and 24A through 24C show the relationship among the drive signal amplitude as the operation principle of the configuration shown in FIG. 21A and the configuration shown in FIG. 22A, the change in the detected f0 signal component, and the 2×f0 signal component to explain the principle of the ninth and tenth modes for embodying the present invention. FIGS. 23A and 23B show the case in which the drive signal amplitude indicates the optimum value. The graph at the center of FIG. 23A shows the drive-voltage-to-optical-intensity characteristic of the LN modulator. The optimum point indicates the modulation with the drive signal amplitude 2×Vπ using the peak, valley, and peak of the characteristic. The pilot signal f0 is superposed such that the drive amplitude can be changed. At this time, the central bias value is constant and the optimum value without the influence of the pilot signal. When the drive signal amplitude is close to the 2×Vπ of the LN modulator, the 2× to component is generated in the detection signal, and no f0 component is contained. FIG. 23B shows a change of the 2×f0 signal in the monitor signal for the drive amplitude shift. The monitor signal can be controlled as the optimum point because it is the maximum at the optimum point.

FIG. 24A shows the case in which the drive signal amplitude is higher than the optimum value $2 \times V\pi(+\Delta)$, and FIG. 24B shows the case in which it is lower than the value $(-\Delta)$. When the drive amplitude is $2 \times V\pi+\Delta$ or it is $2 \times V\pi-\Delta$, the 2×f0 component is not included in the monitor signal component, and the f0 component (the detection signal f0 shown in the figure) is generated. Since the f0 component indicates inverted phase between the drive amplitude $2 \times V\pi$; $+\Delta$ and the drive amplitude $2 \times V$; $-\Delta$, it can be detected in which direction a shift is made, $+\Delta$ or $-\Delta$, according to the phase information.

FIG. 24C shows the synchronization detection result of the monitor f0 signal with respect to the drive amplitude shift and the original pilot signal. The monitor signal indicates 0 (zero) at the optimum point, and has the polarity before and after the point by the phase change. Therefore, the shift direction can be confirmed while watching the polarity, and the optimum point can be controlled. From the absolute value of the monitor signal, control is performed such that the monitor signal can be minimum, thereby setting the drive amplitude to the optimum value.

Thus, the 2×f0 component in the monitor signal can be detected, and the drive signal amplitude is adjusted such that the value can be the maximum. Otherwise, the f0 component in the monitor signal is detected and the drive signal amplitude is adjusted to set the value to substantially 0 (zero), thereby obtaining the optimum drive signal amplitude.

FIGS. 25A through 25C show the effect of the simulation of the operation according to the ninth and tenth modes for embodying the present invention.

FIG. 25A shows the configuration of the device estimated in the simulation. The same configuration as in FIG. 21A or 22A is assigned the same reference numeral.

FIG. 25B shows the intensity of the f0 component as the drive amplitude shift with respect to the intensity of the f0 component. As clearly shown in FIG. 25B, the f0 component indicates the minimum value around the vicinity of $V\pi$. FIG. 25C shows the intensity of the 2×f0 component as the drive amplitude shift with respect to $V\pi$. As clearly shown in FIG. 25C, it is clear that the intensity of the 2×f0 component is maximum in the vicinity of $V\pi$.

In the above-mentioned modes for embodying the present invention, the synchronization detection unit can make an adjustment such that the drive amplitude can be the optimum point using the monitor signal, and according to the control information, the control unit provides an offset to shift the optimum point of the drive amplitude for operation.

FIG. 26A shows an example of the configuration for supplying an offset according to the eleventh mode for embodying the present invention. In FIG. 26A, the same component as in FIGS. 21A and 22A is assigned the same reference numeral.

In the eleventh mode for embodying the present invention, the optical power of the optical transmitter output is monitored, and the amount of offset is varied according to the information. To attain this the output from the PD 13 is input to an offset amount variable unit 40 to provide a signal to be supplied to the amplitude control unit 35 with the signal for adjustment of an offset amount. With this configuration, the amount of an offset is determined by an optical power value. However, there is another method of adding in advance a fixed amount of offset. As shown in FIGS. 26B and 26C, the drive amplitude shift of the point at which the f0 component is the minimum, and the point at which the synchronization detection characteristic is 0 is different from the value of $V\pi 0$ by the offset $\alpha$. The function of the offset amount variable unit 40 can also be performed in the control unit.

FIG. 27 shows the configuration of the present invention applied to the transmission unit for the RZ-DQPSK system as the twelfth mode for embodying the present invention. In this example, the configuration shown in FIG. 22A of the present invention is applied to the DQPSK modulation unit, and the configuration shown in FIG. 13A of the present invention is applied to the RZ modulation unit. In this example, the light source 10, the phase modulation unit 11 including a waveguide and a phase shift unit ($\pi/2$), and the intensity modulator 11a for modulating to an RZ pulse are main components. Among them, the present mode for embodying the present invention is applied to the upper and lower arms (I arm and Q arm) of the DQPSK modulation unit. Each of the upper and lower arms performs the electrical signal drive by the 2×$V\pi$ using the peak, valley, and peak of the drive-voltage-to-optical-intensity characteristic of the LN modulator, and the optimum point of the drive amplitude can be controlled by applying the present invention, thereby maintaining the quality of the transmission signal. In this example, FIG. 27 shows an example of applying the configuration shown in FIG. 22A and FIG. 13A. One of the configurations can be applied, and any other configuration can be applied. That is, the applied configuration is not limited to those listed above.

When there are a plurality of control targets such as the RZ-DQPSK modulation system shown in FIG. 27, a low frequency signal of the same frequency is used as a pilot signal, and time division control is performed.

a plurality of low frequency signals of different wavelengths are used as pilot signals, and simultaneous control is performed.

a plurality of low frequency signals of different wavelengths are used as pilot signals, and time division control and simultaneous control are performed in combination.

In the LN modulator, a bias shift of an operation point is generated by a DC drift or a temperature drift. Therefore, it is necessary to constantly set the optimum value for the bias voltage to compensate for the shift.

As described below, the monitor circuit unit can be commonly used between the electrical signal amplitude control and the LN modulator bias control.

Figure 28:
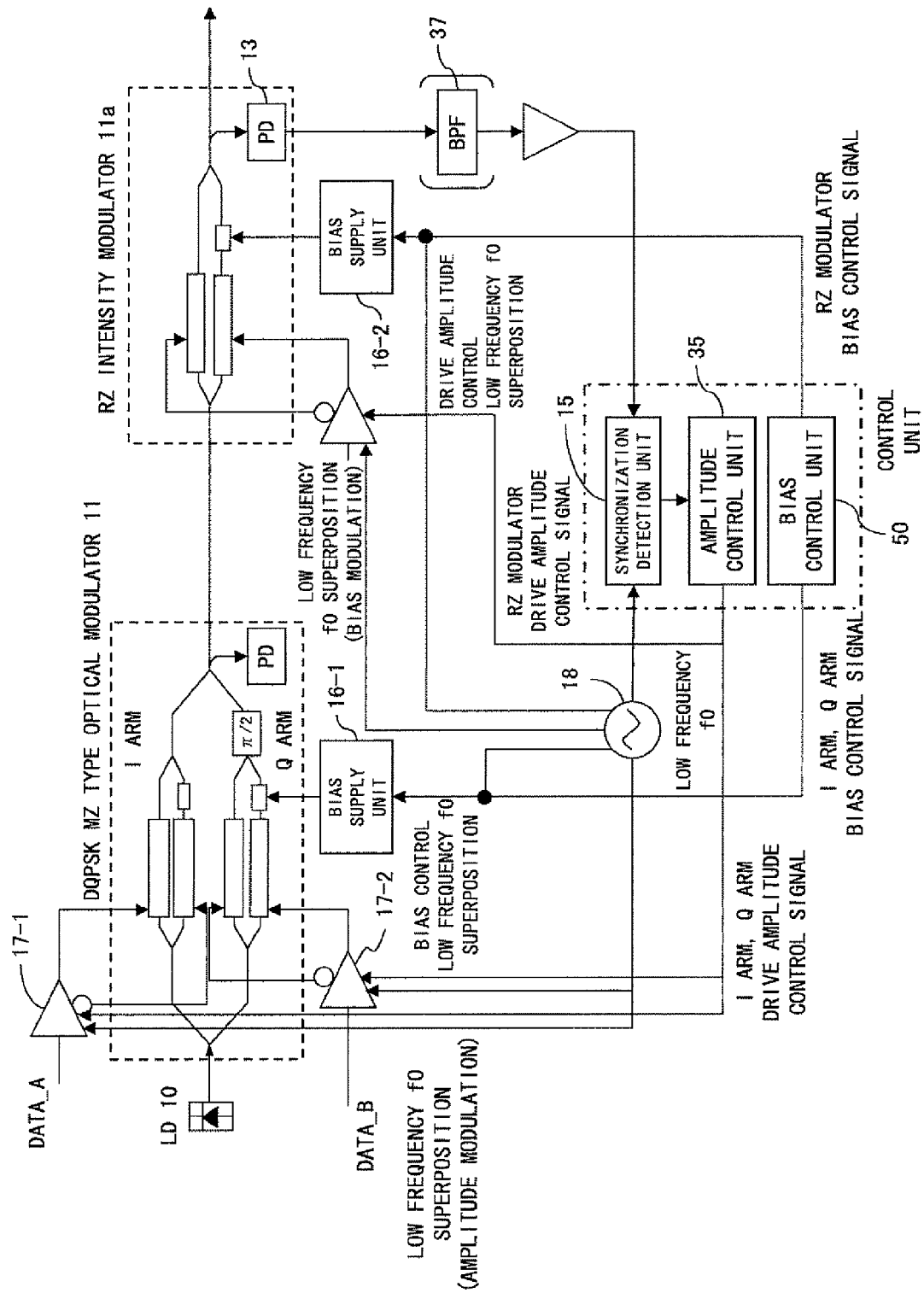
FIG. 28 shows the thirteenth mode for embodying the present invention showing the configuration for performing both drive signal amplitude control and LN modulator DC bias control.

FIG. 28 shows the configuration of performing both the drive signal amplitude control and the LN modulator DC bias control as the thirteenth mode for embodying the present invention. In FIG. 28, the same configuration as in FIG. 27 is assigned the same reference numeral, and the explanation is omitted here. The drive signal amplitude control and the DC bias control are both based on the principle that the f0 component of a monitor signal is detected in control using the pilot signal f0, and the control is performed such that the component can be close to 0 (zero). Therefore, the functions of the control units are the same. There are six control targets in this case, that is, two points for drive signal amplitude control by the DQPSK modulation unit, two points for LN modulator DC bias control, one point for drive signal amplitude control by the RZ modulation unit, and one point for LN modulator DC bias control. In addition to the method of performing time division control using one frequency on the six portions shown in FIG. 28, simultaneous control is performed separately using a plurality of low frequency signals having different wavelengths or in combination with time division control.

Figure 29B:
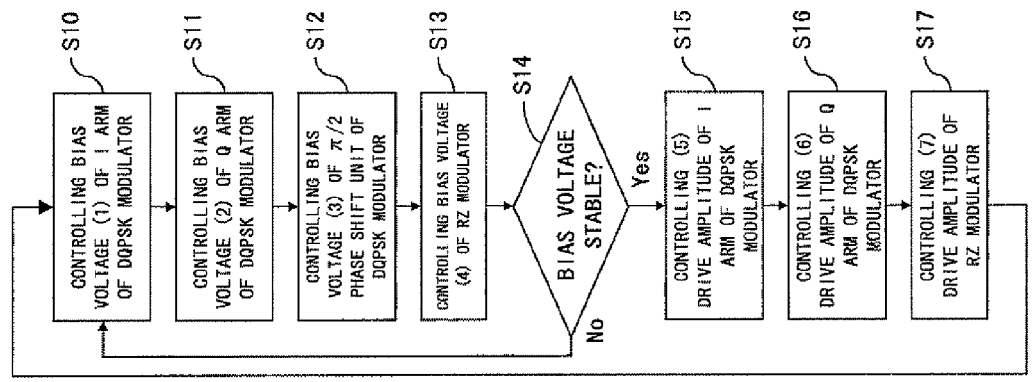
FIGS. 29A and 29B show the flow of the control according to the thirteenth mode for embodying the present invention.
Figure 29A:
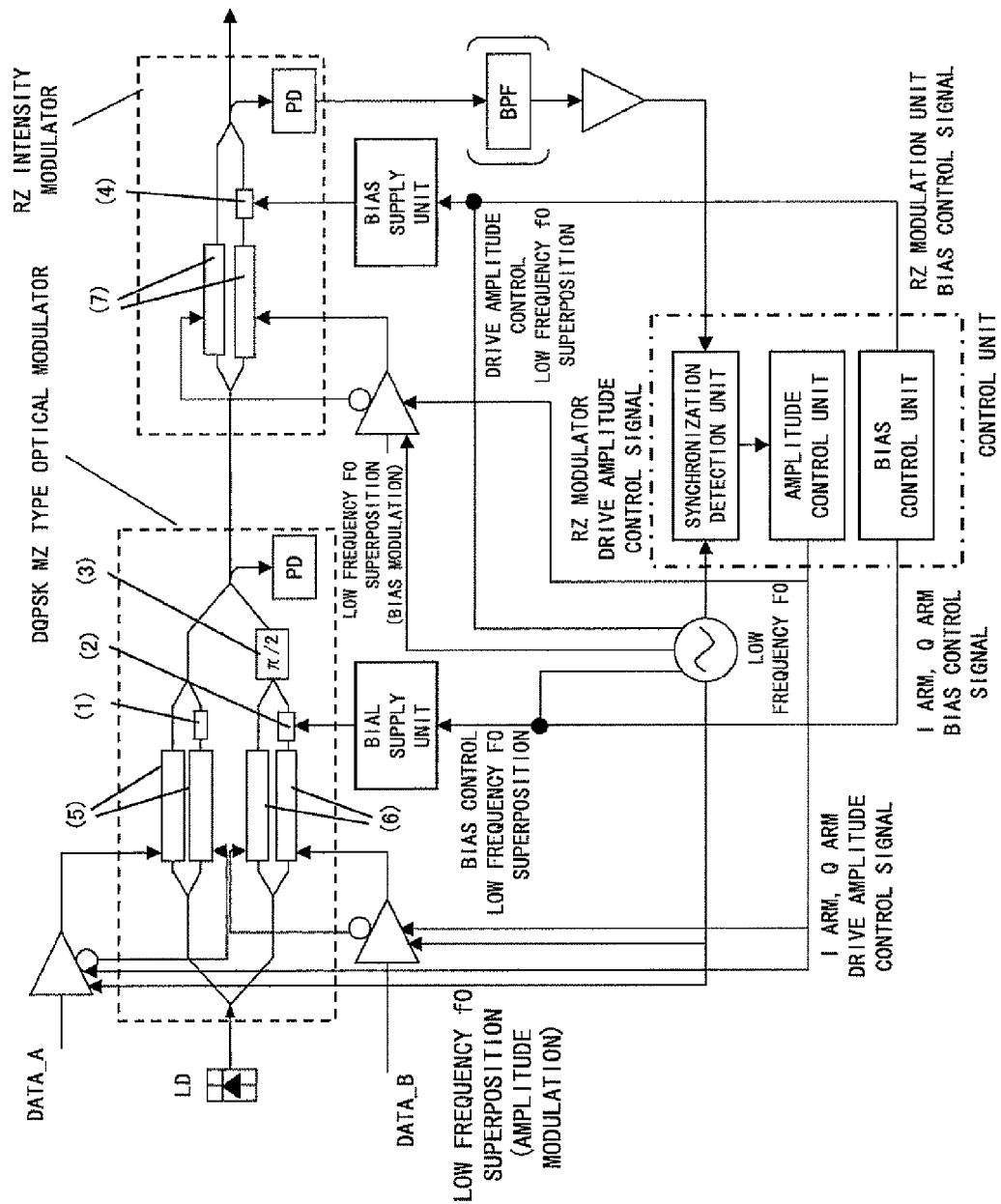

FIGS. 29A and 29B show the flow of the control according to the thirteenth mode for embodying the present invention. FIG. 29A shows the numbers for explanation of the order of control in the configuration shown in FIG. 28. FIG. 29B is a flowchart of the process. In performing the control, it is necessary to set the DC bias at the optimum point in the drive signal amplitude control. Therefore, it is desired to perform the bias control first, and then the drive signal amplitude control.

The explanation is given below by referring to FIG. 29B. First, in step S10, the bias voltage of the I arm of the DQPSK is controlled. Then, in step S11, the bias voltage of the Q arm is controlled. In step S12, the bias of the λ/2 phase shift unit of the DQPSK is controlled, and then the bias of the RZ modulator is controlled (step S13). After repeating plural times of bias voltage control, the bias voltage becomes stable (step S14), the drive amplitude of the I arm of the DQPSK is controlled (step S15), and then the drive amplitude of the Q arm is controlled (step S16). Then, the drive amplitude of the RZ modulator is controlled (step S17). Then, the bias voltage control is started again. In this specification, the output of the RZ modulator is monitored by the PD for the control monitor, but a control monitor can be applied to the output of the DQPSK modulator and the RZ modulator to perform the bias control and then drive signal amplitude control in each modulator. In this flowchart, when it is not necessary to consider the influence on the main signal when, for example, the system is booted up, the control order is not limited. The description above is only an example of a configuration and a control system, and the present invention is not limited to those described above. In FIGS. 27 and 28, the connection order of the DQPSK modulator and the RZ modulator can be switched.

Figure 30:
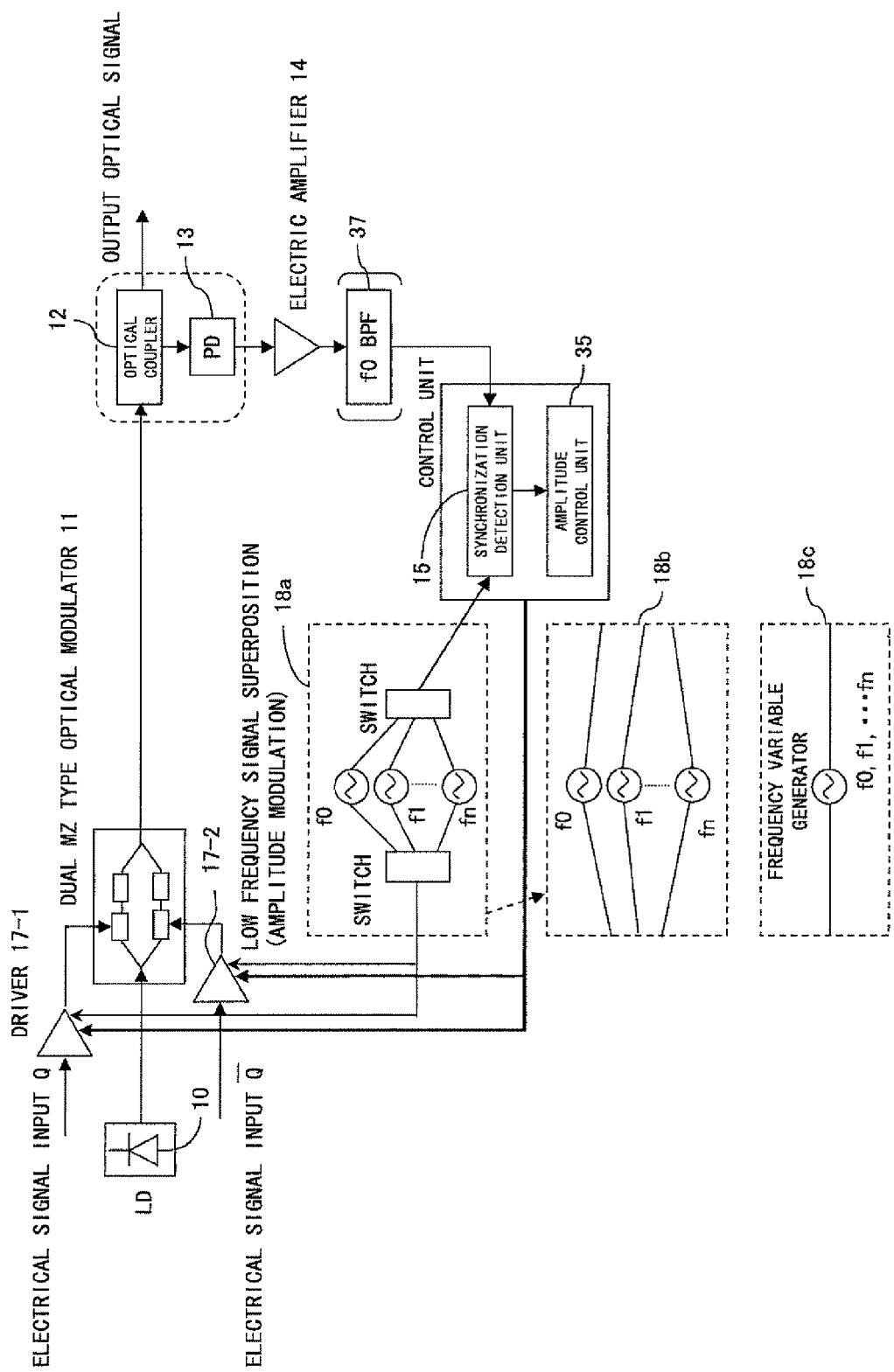
FIG. 30 shows an example of the configuration of superposing the low frequency signal when a plurality of low frequency signals of different wavelengths are used.

FIG. 30 shows an example of a configuration of superposing a low frequency signal when a plurality of low frequency signals having different wavelengths are used, and FIG. 31 shows an example of a configuration of a monitor unit for monitoring a superposition signal. When signals of different wavelengths are superposed, a plurality of connection lines can be switched for each connection as shown by 18a in FIG. 30, the connection can be made by the low frequency generator as shown by 18b in FIG. 30, and a frequency variable generator can be applied as shown by 18c in FIG. 30. Furthermore, these functions can be configured and executed by the control unit. The frequency variable generator can be, for example, a VCO and the like. When superposed signals of different wavelengths are monitored using a band pass filter, a plurality of connection lines to which the respective band pass filters are connected can be switched as shown by 37-1 in FIG. 31, can be connected to a plurality of filters as shown by 37-2 in FIG. 31, and can be used with a central frequency variable filter as shown by 37-3 in FIG. 31. The central frequency variable filter can be, for example, produced using the MEMS technology.

The fluctuation of the drive amplitude has a strong possibility of a long cycle as compared with the fluctuation of a bias voltage. Therefore, the bias voltage control is to be constantly performed. However, there is a method of performing the drive amplitude control on a long cycle during the system operation, or performing the control only when the system is booted up. Especially, since it is not necessary to consider the influence on a main signal when the system is booted up, the amplitude of the pilot signal to be superposed on the main signal is enlarged to improve the sensitivity of the control. When the system is booted up, the optical power is measured by a power meter to adjust the drive amplitude, or the amplitude of the pilot signal is enlarged to shorten the convergence time by improving the accuracy of the control, and then the amplitude of the pilot signal is reduced to minimize the influence of the pilot signal on the main signal, thereby performing the drive amplitude control in a longer period than the bias voltage control.

What is claimed is:

1. An optical transmitter having a configuration for controlling amplitude of a drive signal to be provided for an optical modulator, comprising:
   an optical detector to detect an output optical signal of the optical modulator, and to acquire information about intensity of the output optical signal; and
   a controller to adjust the amplitude of the drive signal to be provided for the optical modulator in accordance with the information about the intensity of the optical signal and an offset which is a given offset or a calculated offset using a signal from the optical detector, wherein:
   the offset is difference between the amplitude of the drive signal to be provided for the optical modulator in accordance with the information about the intensity of the optical signal and target amplitude of the drive signal.

2. The optical transmitter according to claim 1, further comprising
   a bias controller to control a bias voltage to the optical modulator.

3. The optical transmitter according to claim 1, further comprising:
   a plurality of optical modulators, wherein
   the amplitude adjuster is provided commonly for each optical modulator.

4. The optical transmitter according to claim 1, wherein
   the controller provides an offset for a monitor signal as a function of a controller input stage or an inside unit of the controller, and performs optimization on an entire performance of an optical transmission system including the optical transmitter.

5. The optical transmitter according to claim 1, wherein
   the optical modulator is a Mach-Zehnder type optical modulator.

6. A control method for use with an optical transmitter having a configuration for controlling amplitude of a drive signal to be provided for an optical modulator, comprising:
   detecting an output optical signal of the optical modulator, and acquiring information about intensity of the output optical signal;
   adjusting the amplitude of the drive signal to be provided for the optical modulator in accordance with the information about the intensity of the optical signal; and
   adjusting the amplitude of the drive signal to be provided for the optical modulator in accordance with the information about the intensity of the output optical signal and an offset which is a given offset or a calculated offset using the detected output optical signal, wherein
   the offset is difference between the amplitude of the drive signal to be provided for the optical modulator in accordance with the information about the intensity of the optical signal and proper amplitude of the drive signal.

7. An optical transmitter having a configuration for controlling amplitude of a drive signal to be provided for a first optical modulator, comprising:
   a second modulator to provide with modulation of optical intensity by a lower frequency signal than the drive signal;
   an optical detector to detect an output optical signal of the optical modulator, and to acquire information about intensity of the output optical signal; and
   a controller to adjust the amplitude of the drive signal to be provided for the optical modulator using a result of extracting a component of an optical signal corresponding to the low frequency signal component and an offset which is a given offset or a calculated offset using a signal from the optical detector, wherein the offset is difference between the amplitude of the drive signal to be provided for the optical modulator using a result of extracting a component of an optical signal corresponding to the low frequency signal component and proper amplitude of the drive signal.

8. The optical transmitter according to claim 7, wherein the controller adjusts the amplitude of the drive signal to be provided for the optical modulator such that a component of the output optical signal of the same frequency as the low frequency signal can be close to 0 (zero).

9. The optical transmitter according to claim 7, wherein the controller adjusts the amplitude of the drive signal to be provided for the optical modulator such that a component of the output optical signal of the frequency twice as high as the low frequency signal can be close to maximum.

* * * * *

UNITED STATES PATENT AND TRADEMARK OFFICE
CERTIFICATE OF CORRECTION

| | | |
|---|---|---|
| PATENT NO. | : 8,145,069 B2 | Page 1 of 1 |
| APPLICATION NO. | : 11/740954 | |
| DATED | : March 27, 2012 | |
| INVENTOR(S) | : Toshiki Tanaka et al. | |

It is certified that error appears in the above-identified patent and that said Letters Patent is hereby corrected as shown below:

Column 14, Line 13, In Claim 1, after "is" insert -- a --.

Column 14, Line 16, In Claim 1, after "and" insert -- a --.

Column 14, Line 49, In Claim 6, after "is" insert -- a --.

Column 14, Line 52, In Claim 6, after "and" insert -- a --.

Column 15, Line 1, In Claim 7, after "is" insert -- a --.

Column 15, Line 5, In Claim 7, after "and" insert -- a --.

Signed and Sealed this
Twelfth Day of June, 2012

David J. Kappos
*Director of the United States Patent and Trademark Office*